United States Patent [19]

Kadota

[11] Patent Number: 5,604,846
[45] Date of Patent: Feb. 18, 1997

[54] PRINTER AND METHOD FOR DEVELOPING PRINT DATA

[75] Inventor: Masatoshi Kadota, Takahama, Japan

[73] Assignee: Brother Kogyo Kabushiki Kaisha, Aichi-ken, Japan

[21] Appl. No.: 542,255

[22] Filed: Oct. 12, 1995

[30] Foreign Application Priority Data

| Oct. 13, 1994 | [JP] | Japan | 6-276110 |
| Apr. 10, 1995 | [JP] | Japan | 7-084321 |
| May 16, 1995 | [JP] | Japan | 7-116975 |

[51] Int. Cl.⁶ ............................................. G06K 15/00
[52] U.S. Cl. ................................... 385/115; 395/114
[58] Field of Search .................................. 395/110, 112, 395/113, 114, 115, 116, 164, 165, 166; 358/404, 444, 261.1, 261.4, 428, 433

[56] References Cited

U.S. PATENT DOCUMENTS

| 4,791,680 | 12/1988 | Yokoe et al. | 358/261.1 |
| 5,108,207 | 4/1992 | Isobe et al. | 395/115 |
| 5,129,050 | 7/1992 | Ikenoue et al. | 395/115 |

*Primary Examiner*—Arthur G. Evans
*Attorney, Agent, or Firm*—Oliff & Berridge

[57] ABSTRACT

In order to improve usage efficiency of a RAM provided in a video controller of a laser printer and to prevent occurrence of print overrun errors, a packet data, which contains character/symbol code data and print position information thereof, is developed into a printable format data on a band basis, which is then compressed and stored in an image data buffer provided in the RAM. The compressed image data is retrieved and decoded to restore the original printable format data. The latter data is stored in a print buffer and then sent to the print mechanism for printing. When the image data buffer does not have sufficient memory space for storing subsequent one band's worth of the packet data in compressed form, the data which has already been processed is erased to secure free area of the image data buffer. Alternatively, resolution of the printable format data stored in the image data buffer in compressed form is reduced to secure free memory space in the image data buffer.

26 Claims, 17 Drawing Sheets

PRINTER AND METHOD FOR DEVELOPING PRINT DATA

BACKGROUND OF THE INVENTION

1. Field of the Invention

The present invention relates to a printer and a method for developing print data. More particularly, the invention relates to a page printer having a print image buffer of less than one page print data capacity, 2. Description of the Related Art A page printer such as a laser printer is capable of performing high-speed printing. Laser printers receive print data, such as text data and image data, from an external device, such as a host computer or a personal computer, and stores the print data as packet data, which includes print information and code data for characters and symbols and print position information for image data. The packet data is developed into bit image data with a printable format and stored in a print image buffer. The developed bit image data for one dot line corresponding to a single raster scan, is sequentially retrieved from the print image buffer and outputted to a print mechanism. The print mechanism then prints the text or image on a print medium such as a sheet of paper.

The bit image data may be formed by retrieving the previously stored bit image data from the print image buffer and by ORing the retrieved bit image data with bit image data freshly developed from packet data. The thus formed bit image data is restored in the print image buffer. This process is called OR-write processes.

As shown in FIG. 1, a print image buffer 162 is provided in the RAM 160 of a control device. The print image buffer 162 is divided into, for example, three bands whose total data capacity is less than one page's worth of print image data. Image data retrieved from the reception buffer 161 is stored in a image data buffer 164. On the other hand, packet data including code data and print position information on the characters and symbols and print position information on the image data, is stored in the packet buffer 163. Print image data of characters and codes and of images are developed in the first, second, and third bands based on the packet data. First, the print image data of the first band buffer is outputted to the print mechanism. Then, while print image data of the second band buffer is being outputted, print image data is again developed in the first band buffer.

That is, band buffers of the print image buffer are cyclically used in order for developing print image data, until all the received print data is outputted to the print mechanisms. When data in one band has been completely outputted to the print mechanism, the data in the next band must be completely developed and ready to be outputted. If the data is not completely developed, a print overrun error will occur wherein an incomplete image will be outputted.

FIG. 2 shows another conventional print data allocation in a RAM 260. The print image buffer 262 has 30 exclusive bands, each band having a fixed capacity of 160 kilobytes. This amounts to a total fixed buffer capacity sufficient for storing one page of bit image data (that, is 5 or 6 megabytes). Packet data produced as described above is stored in the packet data buffer 263.

When free memory storage space of the RAM 260 becomes almost totally used up from expansion of the packet data buffer 263 and the image data buffer 264, print image data for characters and symbols and for images are sequentially developed, based on the packet data, into the print image buffers 262, first in the first band buffer, then the second band buffer, and so on. Afterward, the packet data is erased and any unprocessed print data remaining in the reception buffer 261 is developed into print image data and stored in print image buffer 262 up to the 30th band buffer in the same manner. Then, the print image data in the print image buffer 262 is sequentially retrieved from the first buffer and on to be outputted to the print mechanism and printed on the print medium.

When an exclusive print image buffer is provided with a large fixed storage capacity, formed from a plurality of band buffers that are in total capable of storing one page's worth of bit image data, one page's worth of bit image data is always developed and ready for printing processes. Although print overrun errors will not occur during printing processes, the printer must be provided with a large-size print image buffer to hold the page's worth of bit image data. The RAM is not used very efficiently.

Although providing the print image buffer with a storage capacity for holding less than one page's worth of data will reduce the capacity of the print image buffer, and therefore improve the usage efficiency of the memory in the RAM, print overrun errors are easily generated during printing processes when print image data is developed at a slower rate than print processes can be performed.

Also, required processing time increases because OR-write processes are performed while packet data is developed into bit image data.

SUMMARY OF THE INVENTION

It is an object of the present invention to provide a printer and a print data development method that improves usage efficiency of memory and prevents occurrence of print overrun errors in a printer provided with a print image buffer with a small capacity.

It is another object of the present invention to provide a printer in which process time required for forming bit image data from two pieces of packet data is shortened.

In order to achieve the above and other objects, there is provided a printer which includes a reception buffer storing print data received from an external device, first packet data storing means, developing means, compression means, compressed print image data storing means, judgement means, storage capacity securing means, decoding means and printing means. The first packet data storing means is provided for receiving the print data from the reception buffer and for storing first type packet data including code data indicative of a character or a symbol and print position information indicative of a print position of the character or the symbol identified by the code data. The first type packet data is prepared on a band basis wherein the band is defined by a predetermined range of data amount. The developing means is provided for sequentially developing the first type packet data into print image data in a printable format. The compression means is provided for compressing, according to a predetermined compression format, the print image data developed by the developing means to provide compressed print image data. The compressed print image data is provided for storing the compressed print image data on the band basis. The judgement means is provided for Judging whether or not one band's worth of the compressed print image data can be stored in the compressed print image data storing means. The storage capacity securing means is provided for increasing the storage capacity of the compressed print image data storing means when the judgement means judges that the one band's worth of compressed print image data cannot be stored in the compressed print image data storing means. The decoding means is provided for decoding the compressed print image data stored in the compressed print image data storing means into the print image data. The printing means prints, on a print medium, the print image data provided by the decoding means while feeding the print medium.

A second packet data storing means is further provided for storing second type packet data including print position information indicative of print position of the compressed print image data stored in the compressed print image data storing means. The decoding means decodes the compressed print image data into the print image data in accordance with the second type packet data.

An image data storing means may further be provided for storing image data. In this case, print position information indicative of a print position of the image information is further included in the first type packet data. Each of the image data storing means and the compressed print image data storing means has a variable storage capacity. The storage capacity securing means secures the storage capacity of the compressed print image data storing means enough for storing one band's worth of compressed print image data by erasing of the image data that has been developed into the print image data by the developing means.

Alternatively, the storage capacity securing means secures the storage capacity of the compressed print image data storing means by reducing an amount of data of the one band's worth of compressed print image data to be stored therein. That is, the developing means develops the first type packet data into the print image data of a predetermined resolution, and the storage capacity securing means secures the storage capacity of the compressed print image data storing means by developing the first type packet data into the print image data of a resolution lower than the predetermined resolution. Further, the storage capacity securing means secures the storage capacity of the compressed print image data storing means enough for storing one band's worth of compressed print image data by reducing an amount of data having been stored in the compressed print image data storing means. That is, the developing means develops the first type packet data into the print image data of a predetermined resolution, and the storage capacity securing means secures the storage capacity of the compressed print image data storing means by reducing the predetermined resolution of the compressed print image data having been stored in the compressed print image data storing means no a lower value.

The reduction of the resolution is performed with respect to the auxiliary scanning direction of the print image data.

According to another aspect of the invention, there is provided a printer which includes a reception buffer storing print data received from an external device. The print data includes character/symbol data and image data. The character/symbol data has code data indicative of a character or a symbol and print position information indicative of a print position of the character or the symbol identified by the code data. The image data has image information and print position information indicative of a print position of the image information. The printer further includes first image data storing means for storing image information received from the reception buffer. First packet data storing means is provided for storing first type packet data than includes the code data and the print position information of the character/ symbol data and print position information of the image data. Second image data storing means is provided for storing compressed printable data. The compressed printable data is produced on a band basis from the image information stored in the first image data storing means and the first type packet data stored in the first packet data storing means. Second packet data buffer means is also provided for storing second type packet data including print position information indicative of print position of the compressed printable data stored in the second image data buffer means. Print data storing means is provided for storing printable data decoded from the compressed printable data. Print means performs printing, on a print medium, the printable data received from the print data buffer means.

In the above-described construction, there is further provided developing means for developing, into the printable data, code data stored in the first packet data storing means and the image information stored in the first image data storing means into the printable data on a band basis, and compression means for compressing, according to a predetermined compression format, the printable data developed by the developing means and for supplying compressed printable data to the second image data storing means.

The first packet data snoring means, the second packet data storing means, the first image data storing means, and the second image data storing means are each provided with storage capacities that are variable in accordance with an amount of data to be stored therein. The printer may further includes image data deletion means for deleting, from the first image data storing means, image information whose development has been completed by the first developing means. A total storage capacity of the first packet data storing means, the second packet data storing means, the first image data storing means, and the second image data storing means is constant.

The first packet data storing means has a data storage area, and at least a part of the data storage area is awarded to the second packet data storing means when development and compression processes for data in the part of the data storage area has been completed.

The printer may further include decoding means for decoding, into the printable data, the compressed printable data stored in the second image data storing means and for sequentially developing the printable data in the print data storing means on a band basis based on the second packet data received from the second packet data storing means. The print image storing means temporarily stores the printable data when developed by the first developing means.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
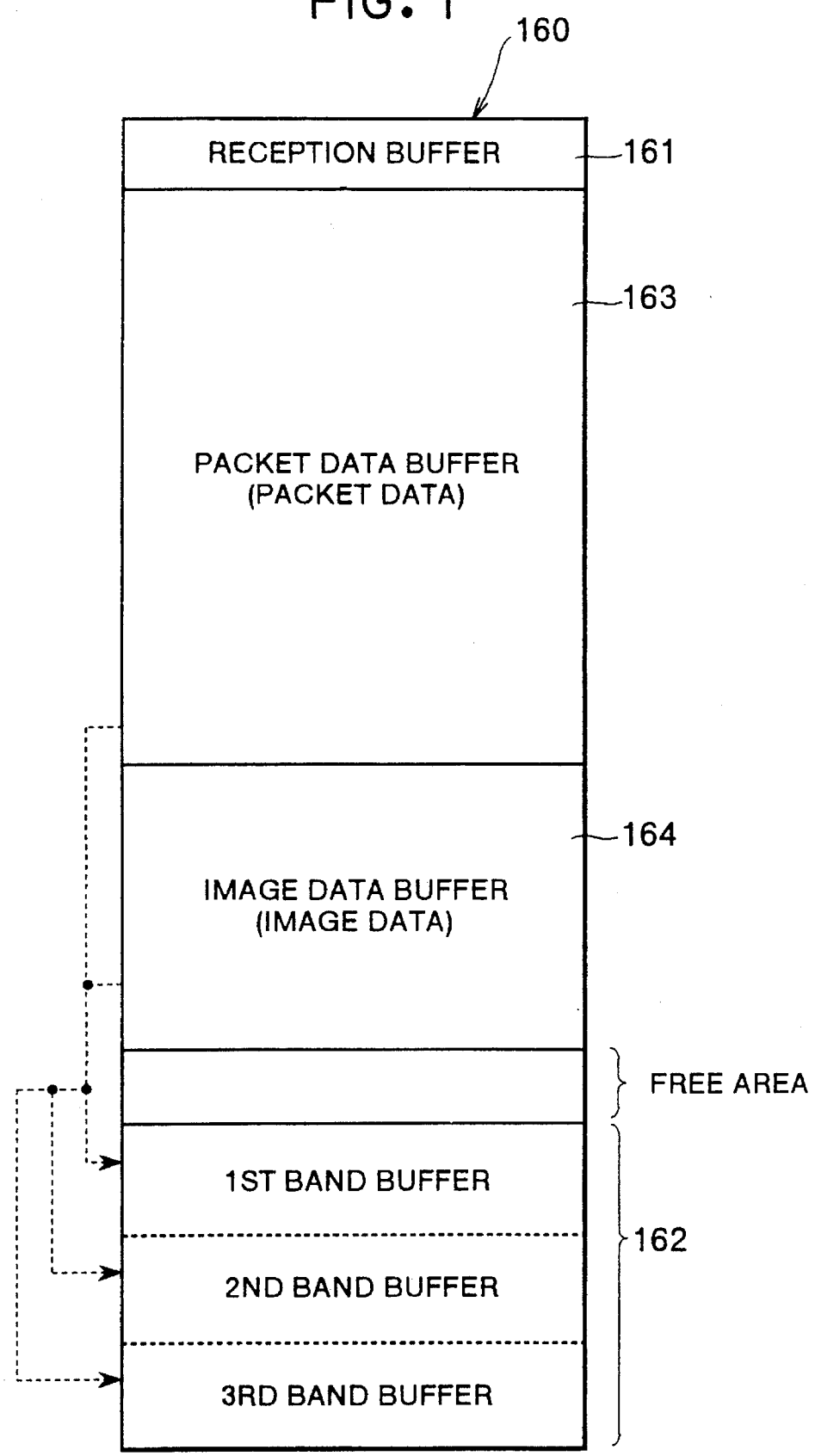
FIG. 1 is an explanatory diagram showing a conventional memory allocation of a RAM in which a print image buffer has a storage capacity of less than one page's worth of data.
Figure 2:
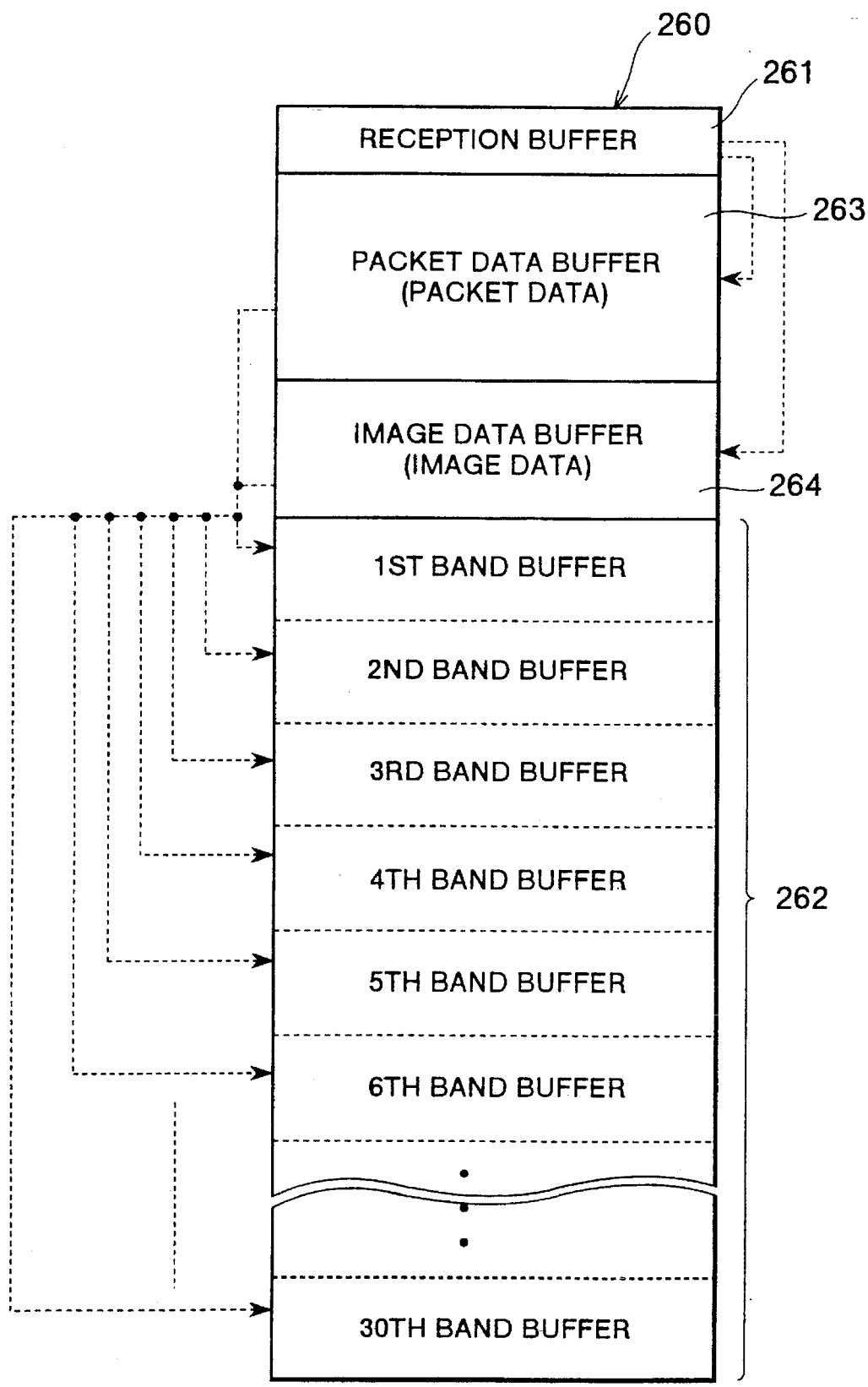
FIG. 2 is an explanatory diagram showing another conventional memory allocation of a RAM in which a print image buffer has a storage capacity of one page's worth of data.
Figure 3:
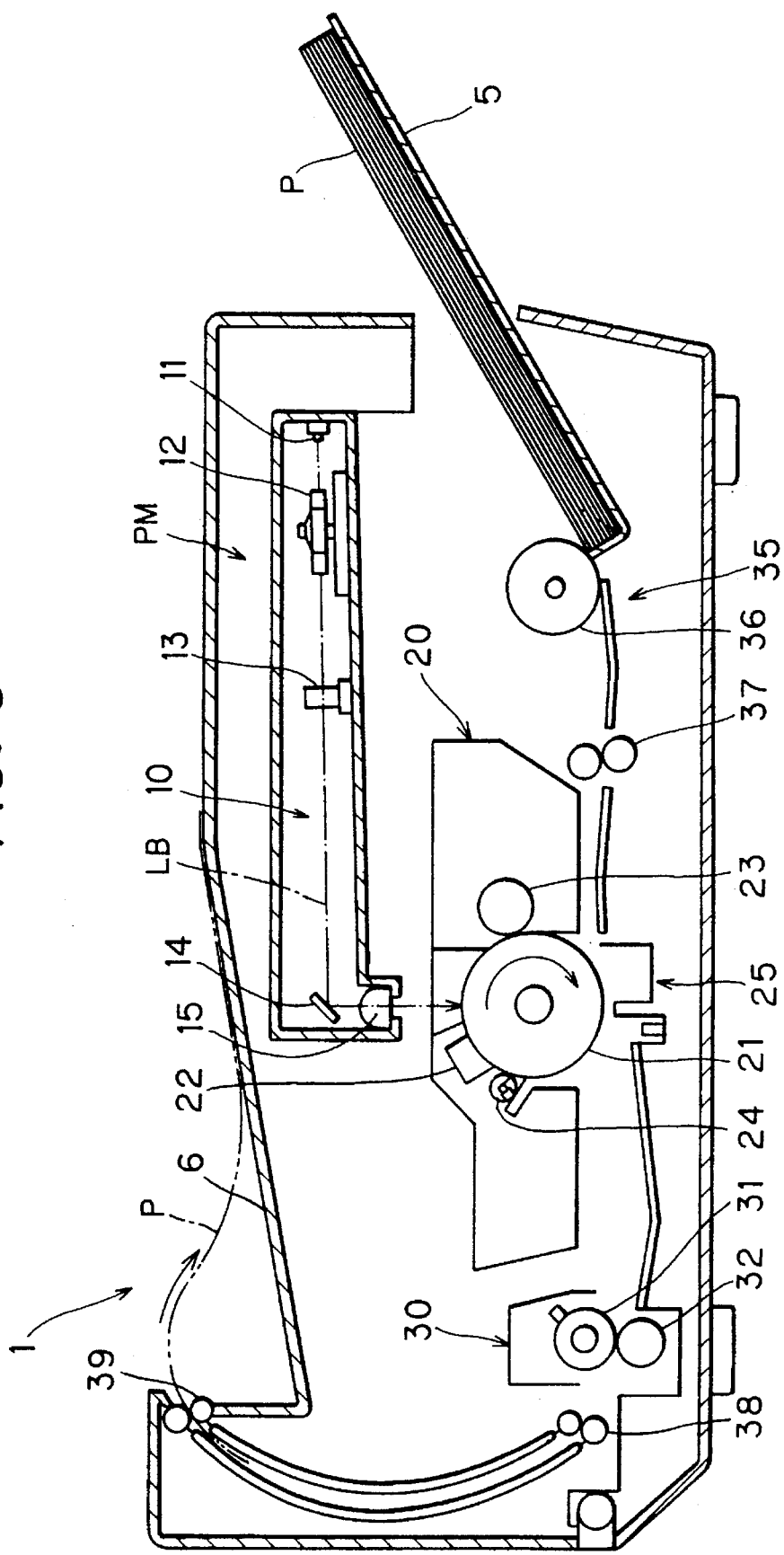
FIG. 3 is a vertical cross-sectional view showing a laser printer to which the present invention is applied.

A printer and method for developing print data according to a first embodiment of the present invention will be described while referring to the accompanying drawings. The first embodiment describes the present invention applied to a laser printer storing, in a reception buffer, print data from an external device, and printing the print data on a recording medium such as paper.

First, an explanation will be provided for a print mechanism PM of the laser printer 1. The Laser printer 1 is provided with a laser scanner unit 10; a process cartridge 20; a transfer/separator unit 25 which includes a transfer discharge device and a discharge needle; a fixing unit 30 which includes a heating roller 31 and a pressing roller 32; and a transport unit 35 which includes a sheet-feed roller 36, a resist roller 37, a transport roller 38, and a discharge roller 39.

The laser scanner unit 10 is provided with a semiconductor laser 11, a polygon mirror 12, a condensing lens 13, a reflection mirror 14, and a lens member 15 made from a compound resin material.

The process cartridge 20 is an assemblage of a photosensitive drum 21, a primary discharge unit 22, a developing cylinder 23, and an exposure lamp 24.

The semiconductor laser 11 emits laser light LB that falls incident on one facet of the polygon mirror 12 which is rotated at a fixed speed. The laser light LB is deflected off each facet of the polygon mirror 12 at a predetermined angle causing the laser light LB to scan within a predetermined angle in a main scanning direction. The laser light LB then passes through the condensing lens 13 to fall incident on the reflection mirror 14, where it is reflected downward coward the lens member 15. The laser light LB then falls incident on the rotating photosensitive drum 21, forming thereon a latent electrostatic image.

The latent electrostatic image formed on the photosensitive drum 21 is developed into a visible toner image from toner supplied from the developing cylinder 23. The visible image is transferred to and printed on a recording sheet P transported from the sheet supply cassette 5. The recording sheet P passes through the fixing unit 30 to be discharged onto the discharge tray 6 via the rollers 38 and 39.

The print mechanism PM also includes other electronic components. For example, the print mechanism PM is provided with a main motor for driving the photosensitive drum 21 and the transport unit 35, and a fixation heater for the heating roller 31. The DC controller circuit 58 is structured for controlling drive of various electronic components including the main motor, the fixation heater, the semiconductor laser 11, and a scan motor for driving the polygon mirror 12.

Figure 4:
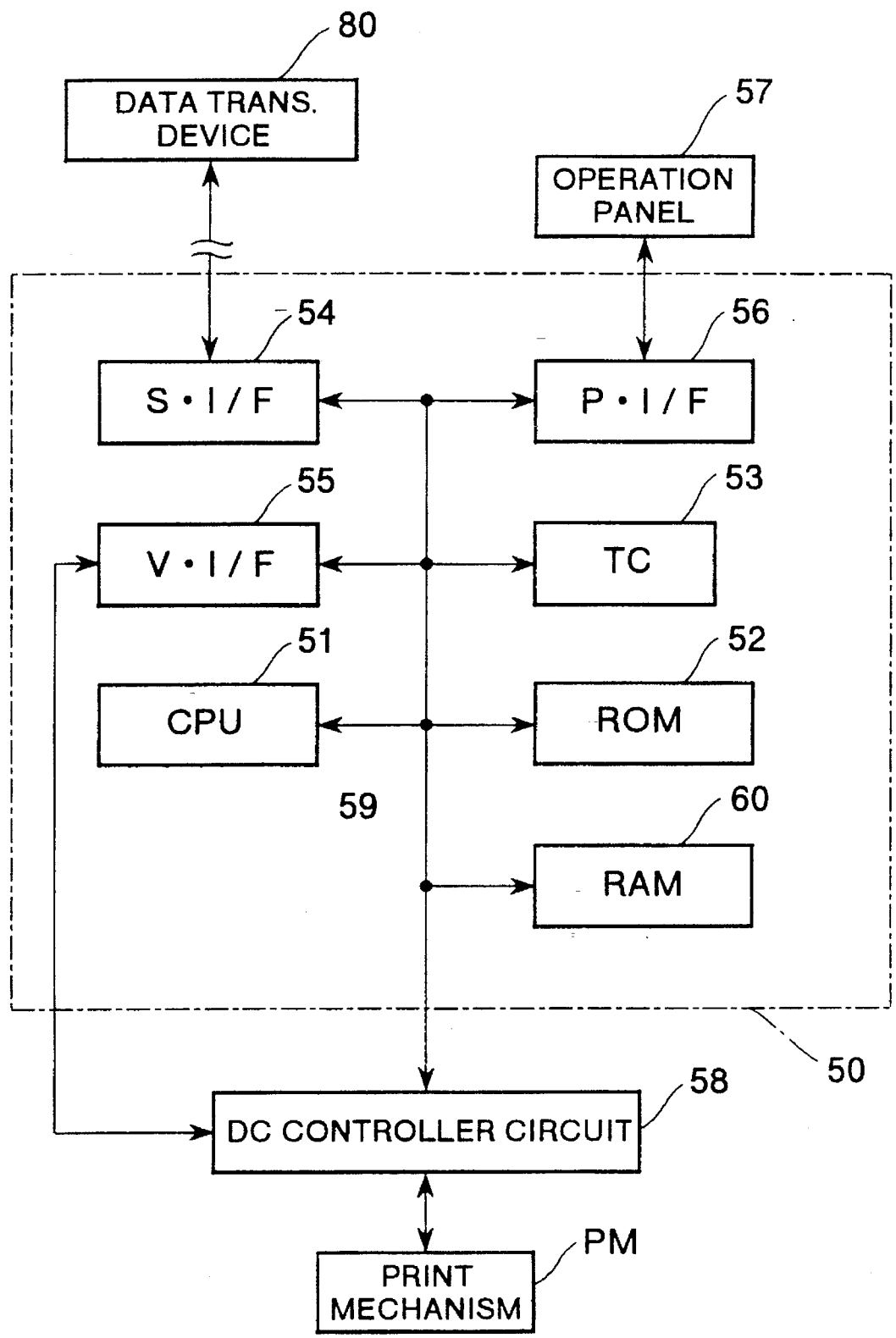
FIG. 4 is a block diagram showing a control section of the laser printer shown in FIG. 3.

Next, an explanation of the control section of the laser printer 1 be provided while referring to FIG. 4. This control section is fundamentally the same as that generally used in laser printers and so will only be described briefly here.

The video controller 50 of the laser printer 1 includes a CPU 51, a ROM 52, a RAM 60, a timing control (TC) 53 a serial interface 54, a video interface 55, and a panel interface 56, all connected to the CPU 51 by a bus 59. The ROM 52 stores various control programs. The RAM 60 is provided with various memories, such as a reception buffer 61 for receiving and storing print data including image data transmitted from an external data transmission device 80 such as a personal computer or a host computer. The timing control circuit 53 is for generating a timing signal for reading and writing reception data into and out of the reception buffer 61. The serial interface 54 is for receiving print data transmitted from the external data transmission device 80. The video interface 55 has two four-kilobyte scan buffers and is for outputting, to a serial DC controller circuit 58, print information converted to bin image data. The panel interface 56 is for receiving signals from an operation panel 57.

In addition to the various control programs provided to a normal laser printer, the ROM 52 has prestored therein a font memory storing print dot pattern data for a plurality of alphanumeric characters and symbols, a buffer management program for managing lead addresses and buffer capacities of each buffer 61 through 66 provided to the RAM 60, and a control program for controlling development of print data. The control program is a particular feature of the present invention and will be described later.

Figure 5:
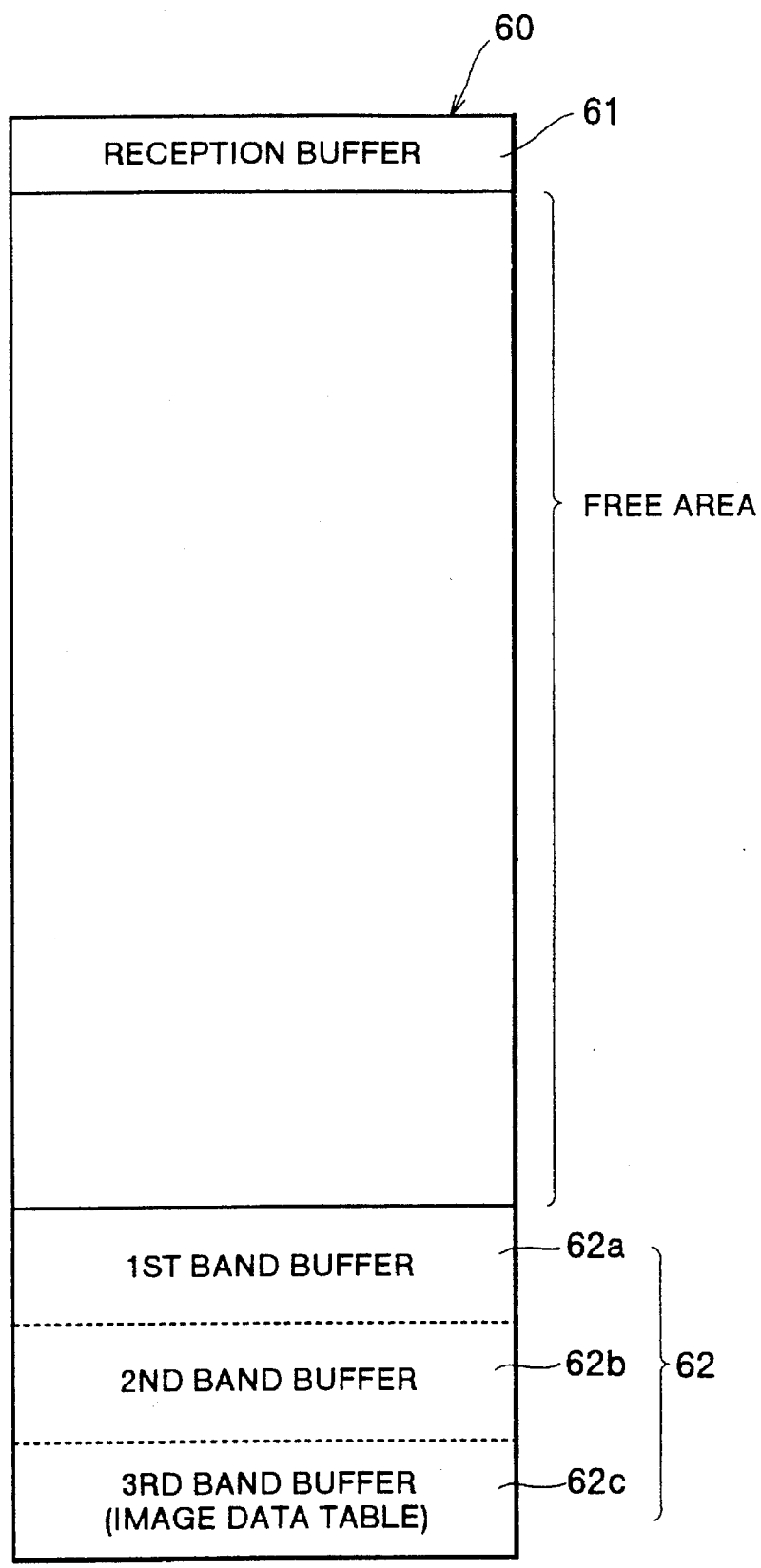
FIG. 5 is an explanatory diagram showing a memory allocation of a RAM when reception of print data is started.

As shown in FIG. 5, the RAM 60 is provided with a reception buffer 61 of a predetermined capacity when receiving print data and a print image buffer 62 having three band buffers 62a through 62c. Memory regions of the RAM 60 other than the reception buffer 61 and the print image buffer 62 are set as free area.

Next, an explanation of a print data development routine performed by the video controller 50 of the laser printer 1 will be provided while referring to FIGS. 6 through 10. In the drawings, individual steps will be referred to as Si wherein 1 represents the number of the step.

The following explanation includes a method of developing print data. The print data received from the external data transmission device 80 will be considered to have been sequentially stored in the reception buffer 61 by a reception routine not shown in the drawings.

Although not shown in the drawings, when the power of the laser printer 1 is turned on, first a variety of initialization processes, such as initialization of the print mechanism PM, are executed. Next, the print data received from the external data transmission device 80 is stored in the reception buffer 61. Then, the print data development routine represented by the flowchart in FIG. 6 is started.

When this routine is started, a print data processing routine is performed (S10). When the code data received from the reception buffer 61 during the print data processing routine is code data for symbols or alphanumeric characters, packet data is stored in a first packet data buffer 63 provided to the RAM 60. The packet data includes code data for the symbol or character in correspondence with print position information on the print position of the symbol or character. When the code data indicates an image, the print position information indicating the image's printing position is stored in the first packet data buffer 63 as packet data. The image data itself is stored in a first image data buffer 64 provided to the RAM 60. As a result, the buffer capacity in the first packet data buffer 63 and the first image data buffer 64 will increase as control of print data processes are executed.

Figure 6:
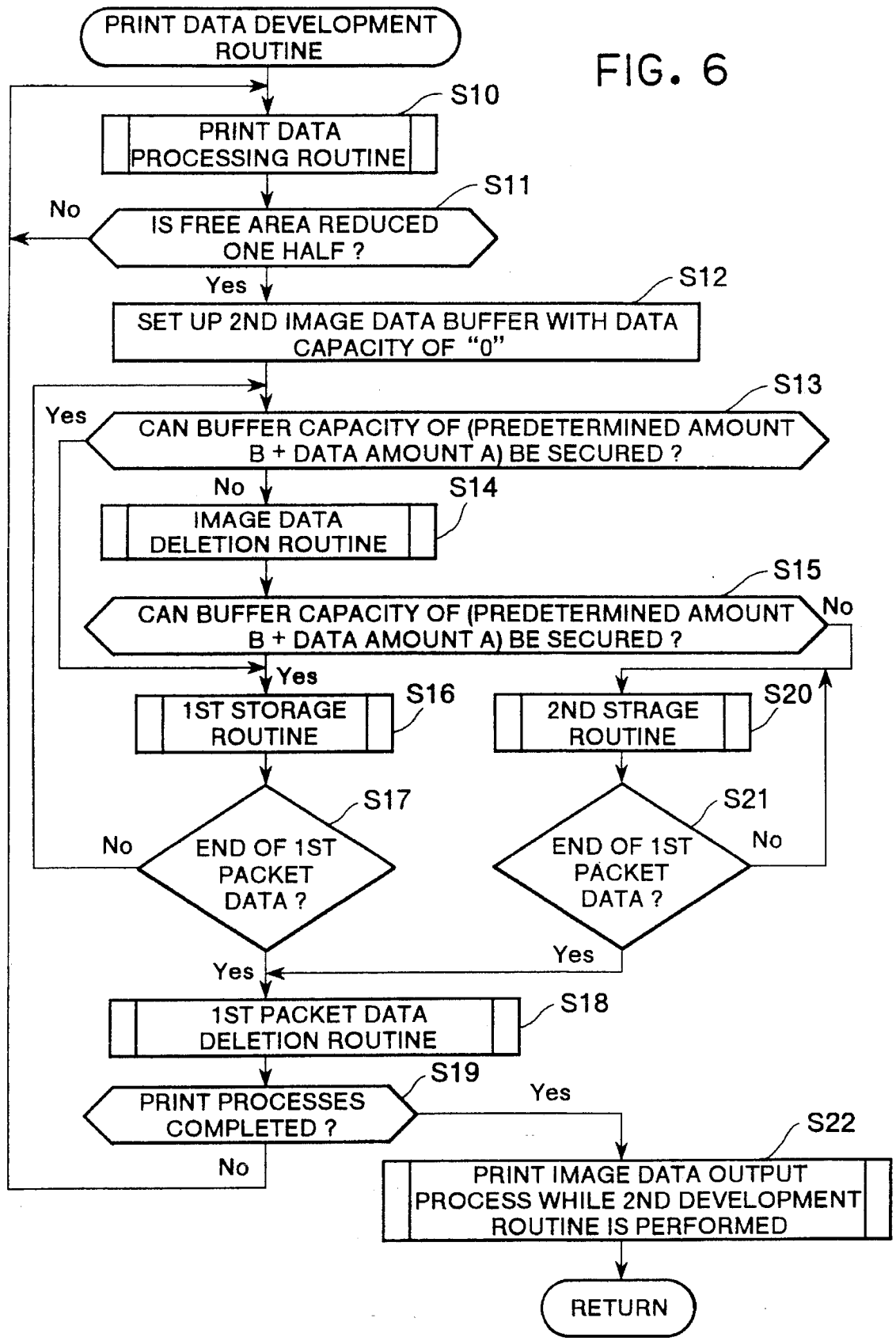
FIG. 6 is a flowchart for illustrating print data developing control executed by the control section.

Next, S10 through S11 will be repeated until, as shown in FIG. 6, increases in the buffer capacities of the first packet data buffer 63 and the first image data buffer 64 reduce the free area to about one half the capacity that was available at the start of the routine (S11:YES), whereupon a second image data buffer 66 with data capacity of 0 is set up in the RAM-60 (S12). Next, when sufficient buffer capacity can be secured in the image data buffer 66 to store further data equal to a single band's capacity B, which is a predetermined amount of, for example, 160 kilobytes (S13:YES), then a first storage routine represented by the flowchart in FIG. 7 will be executed for developing print image data (S16). The predetermined capacity B corresponds to the data amount for one band that has not been compressed by compression processes of S33 (to be described later). Therefore, when there is a possibility that compressed data is greater in data amount than the uncompressed data, then the predetermined capacity B must be increased accordingly referring to the difference in data amount between the compressed data and uncompressed data.

Figure 8:
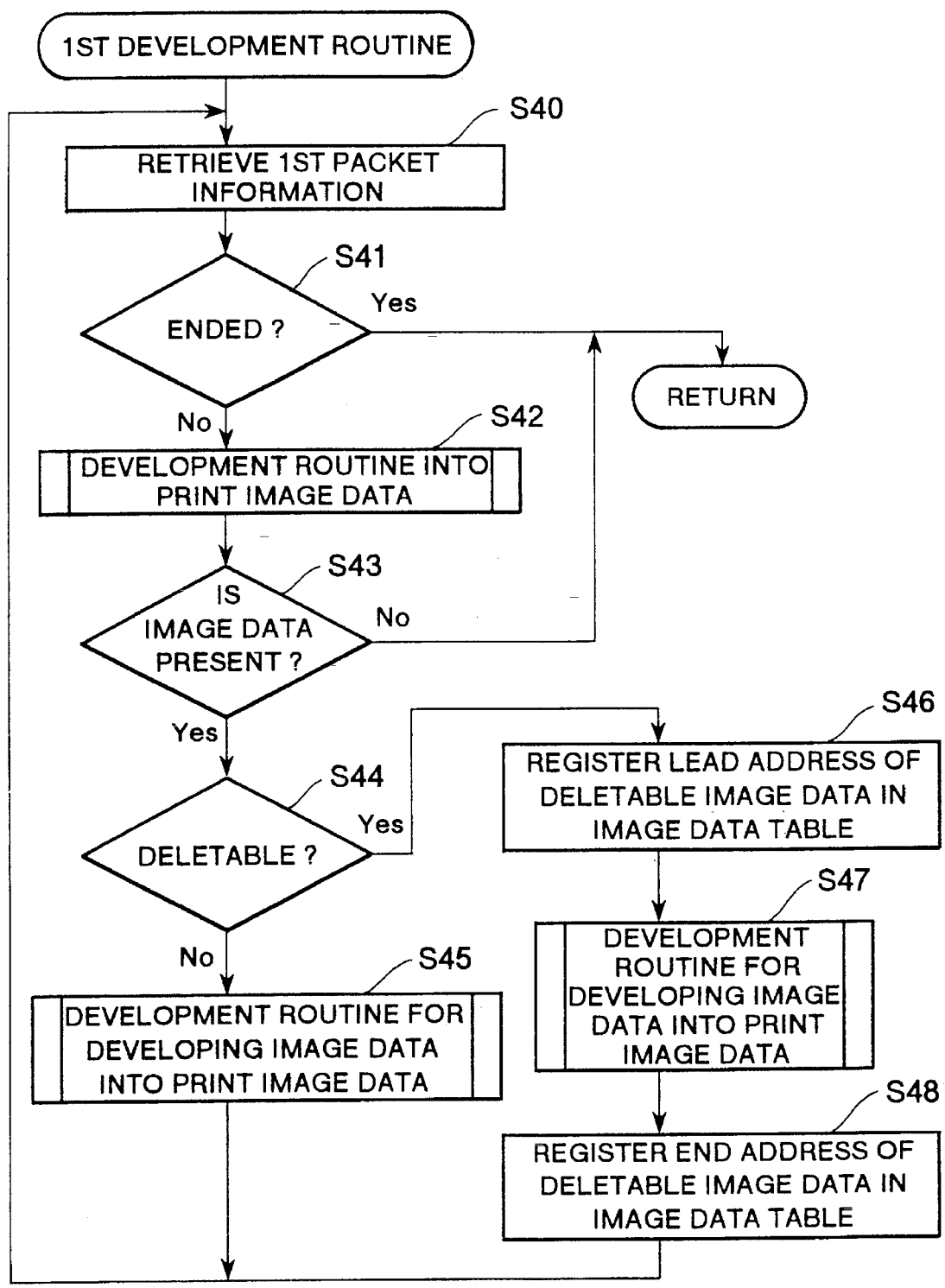
FIG. 8 is a flowchart for illustrating first development routine.
Figure 9:
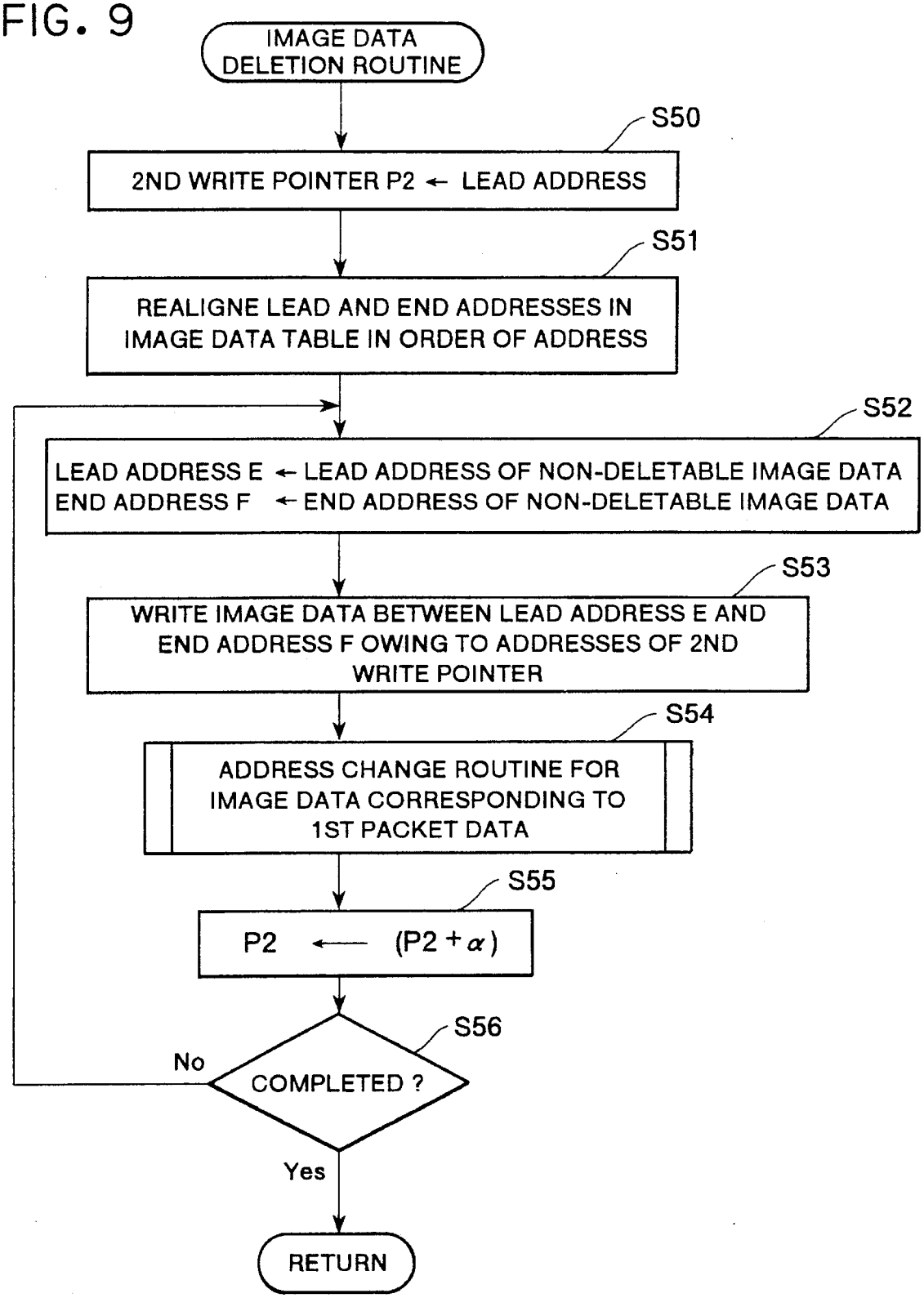
FIG. 9 is a flowchart for illustrating image data deletion routine.

When the first storage routine is started, the first development routine represented by the flowchart in FIG. 8 is executed in S30. At the start of the first development routine, one band's worth of the first packet information is retrieved from the first packet data buffer 63 (S40). Unless the entire band's worth of the first packet data has been developed (S41:NO), print image data for the remaining data is prepared and developed in the first band buffer 62a of the print image buffer 62 (S42).

Then, whether or not the first packet data includes image data is determined in S43. If so (S43:YES), then whether or not the first packet data can be deleted is determined in S44. If so (S44:YES), for example, when the same dot pattern data extends over two bands as a result of converting data with a resolution of 300 dot per inch (dpi) to a resolution of 600 dpi, then the image data is developed in the first band buffer 62a as print image data. Then, the routine returns to S40.

When the image data can be deleted (S44:YES), the lead address in the image data buffer 64 for the deletable image data is registered in the image data table provided in the third band buffer 62c. The image data is developed into print image data in the first band buffer 62a (S47). Then, the end address in the image data buffer 64 of the image data is also registered in the image data table (S48). Then, the routine returns to S40. When the entire band's worth of data has been developed (S41:YES), the program returns to S31 of the first storage routine.

Figure 12:
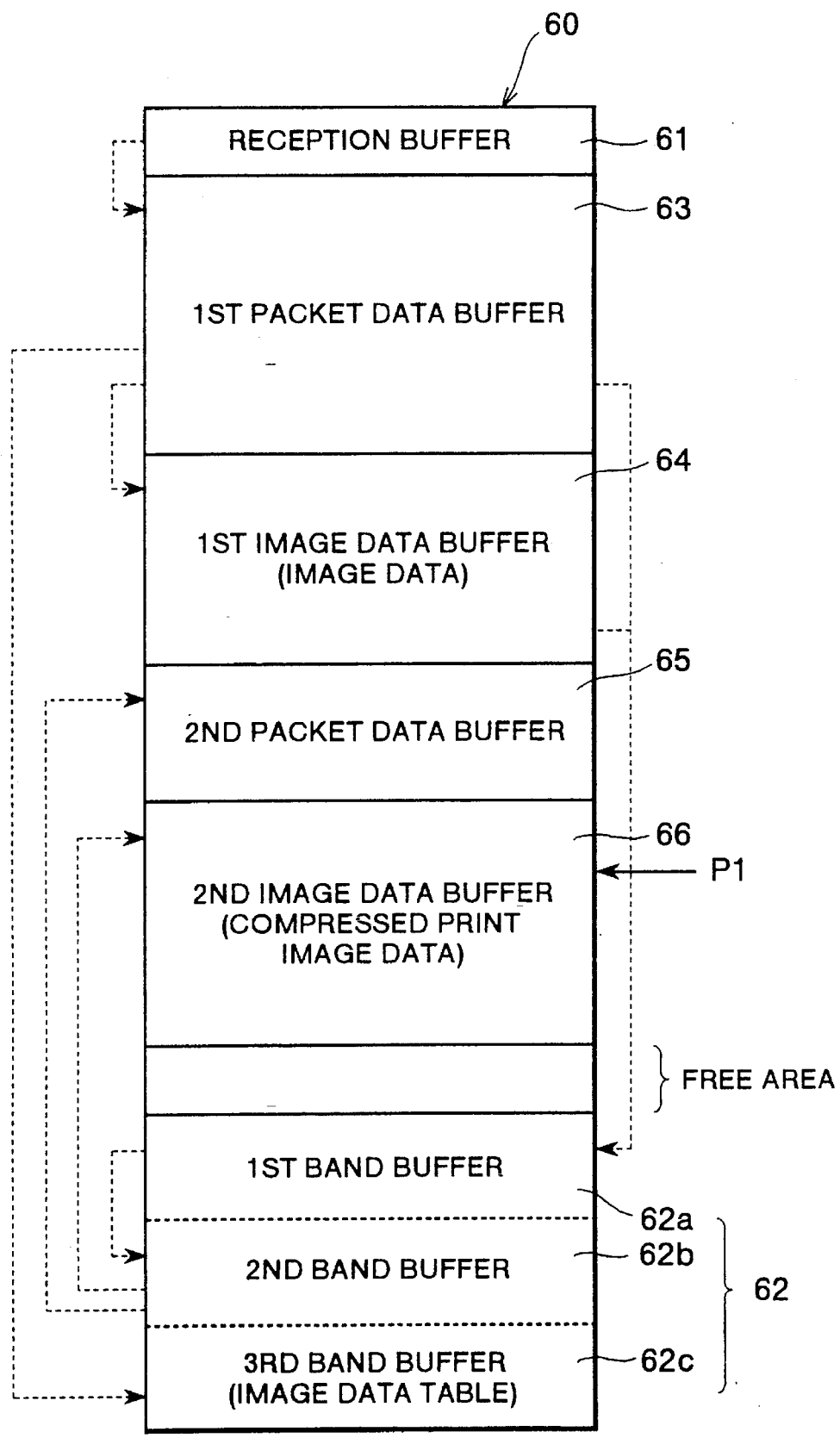
FIG. 12 is an explanatory diagram showing a memory allocation of a RAM in which first and second packet data buffers and first and second image data buffers are provided.
Figure 13:
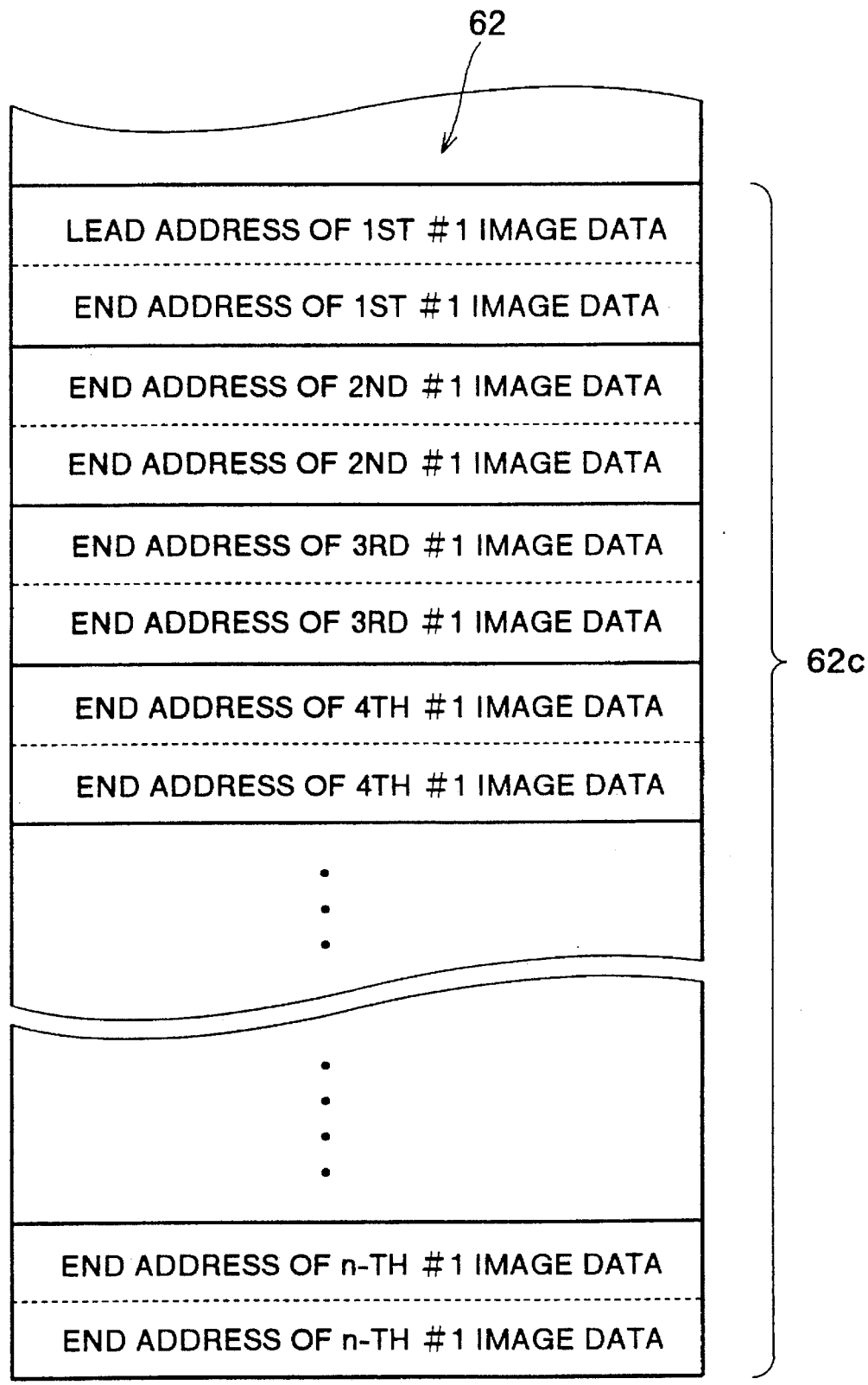
FIG. 13 is an explanatory diagram for illustrating contents of an image data table provided in the third band buffer.
Figure 14:
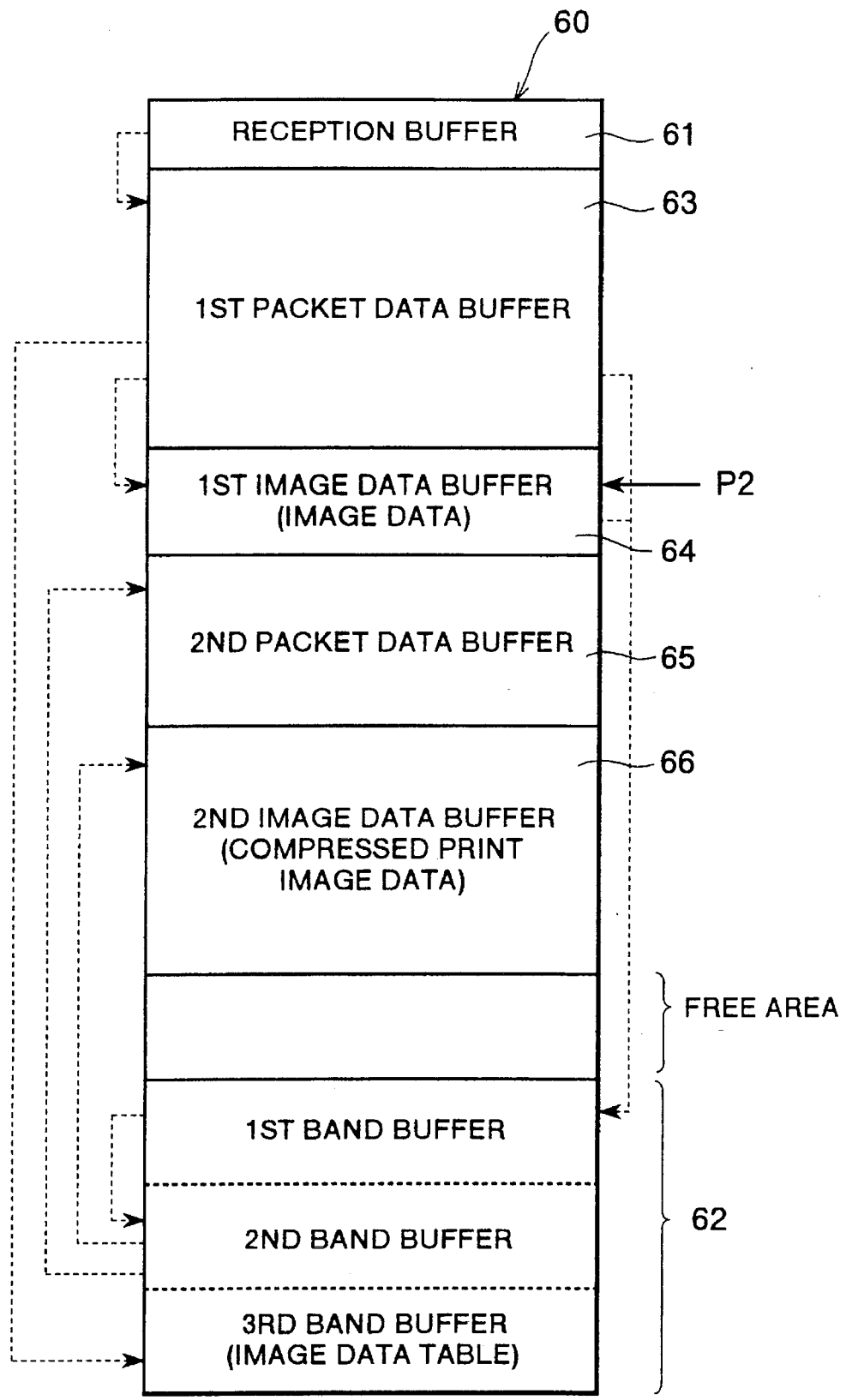
FIG. 14 is an explanatory diagram showing a memory allocation of a RAM in which image data in the first image data buffer is erased.

FIGS. 12 and 13 show processes during, and status of data in various buffers after completion of, the first development routine. As shown in FIG. 12, one band's worth of the first packet data is retrieved from the first packet data buffer 63 and the print image data of images, characters, and symbols are sequentially developed in the first band buffer 62a. As shown in FIG. 13, several data groups formed from leas and end addresses of specific deletable image data are stored in the image data table provided to the third band buffer 62c.

Figure 7:
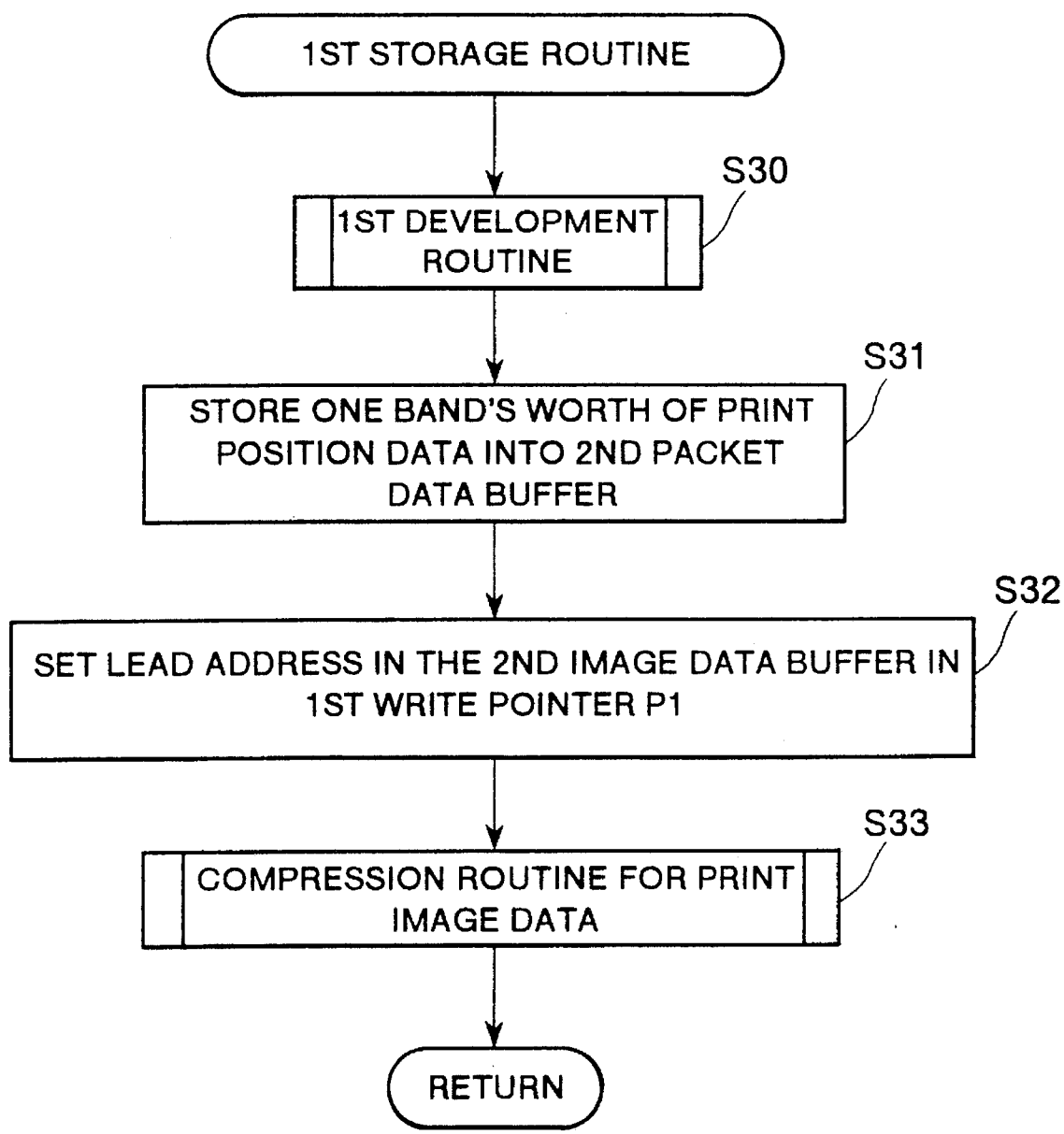
FIG. 7 is a flowchart for illustrating first storage routine.

Next, in S31 of the first storage routine shown in FIG. 7, a second packer data buffer 65 is provided to the ROM 60 and one band's worth of packet data including print position data that was developed in S30, is stored in the second packet data buffer 65. Next, in S32 the second image data buffer 66 is provided to the RAM 60 and the lead address indicating the region in the image data buffer 66 where the next group of data is to be written is set in a first write pointer P1. In S33, the print image data developed in the first band buffer 62a is compressed using a predetermined compression format. Then, the compression routine for storing compressed print image data in the second image data buffer 66 is executed. The program then returns to S17 of the print data development routine shown in FIG. 6.

The steps S13 through S17 of the print data development routine will be repealed until development processes have been performed on all the first packet data stored in the first packet data buffer 63 (S17:NO). The data amount in the second image data buffer 66 and the second packet data buffer 65 will expand during repeated executions of S13 through S17. Accordingly, free area will decrease and the second image data buffer 66 will expand. When it becomes impossible to secure buffer capacity for storing further one band's worth of compressed data having a capacity B (S13:NO), the image data deletion routine represented by the flowchart of FIG. 9 will be executed for deleting image data from the second image data buffer 64 (S14).

At the start of the image data deletion routine, the lead address of the image data buffer 64 is set as a second write pointer P2 (S50). Then, the data groups, formed from the lead and end addresses of specific image data, are rearranged in the image data table in order of address (S51). In S52, non-deletable image data, than is, image data that is not to be deleted and so is not registered in the image data table, is determined based on the first packet data in the first packet data buffer 63, on the image data in the first image data buffer 64, and on the data in the image data table. The lead and end addresses that indicate the location of non-deletable image data in the first image data buffer 64 are snored in the image data table as lead addresses E and end addresses F, respectively.

The image data stored between the lead address E and end address F is moved to, and written starting at the address indicated by the second write pointer P2 (S53). Accordingly, addresses for print position information of unprocessed bands is changed to correspond to the new location of the image data, that is, between the lead address E and end address F in the first packet data buffer 63. The pointer value of the second write pointer P2 is then incremented by a value alpha (where alpha=F−E) to reflect area filled by the data amount of the moved image data (S55). The steps S52 through S56 are repeated until all moving processes have been completed, that is, until no deletable image data exists (S56:NO). When all the deletable image data has been moved (S56:YES), the routine returns to S15 of the print data development routine.

Figure 10:
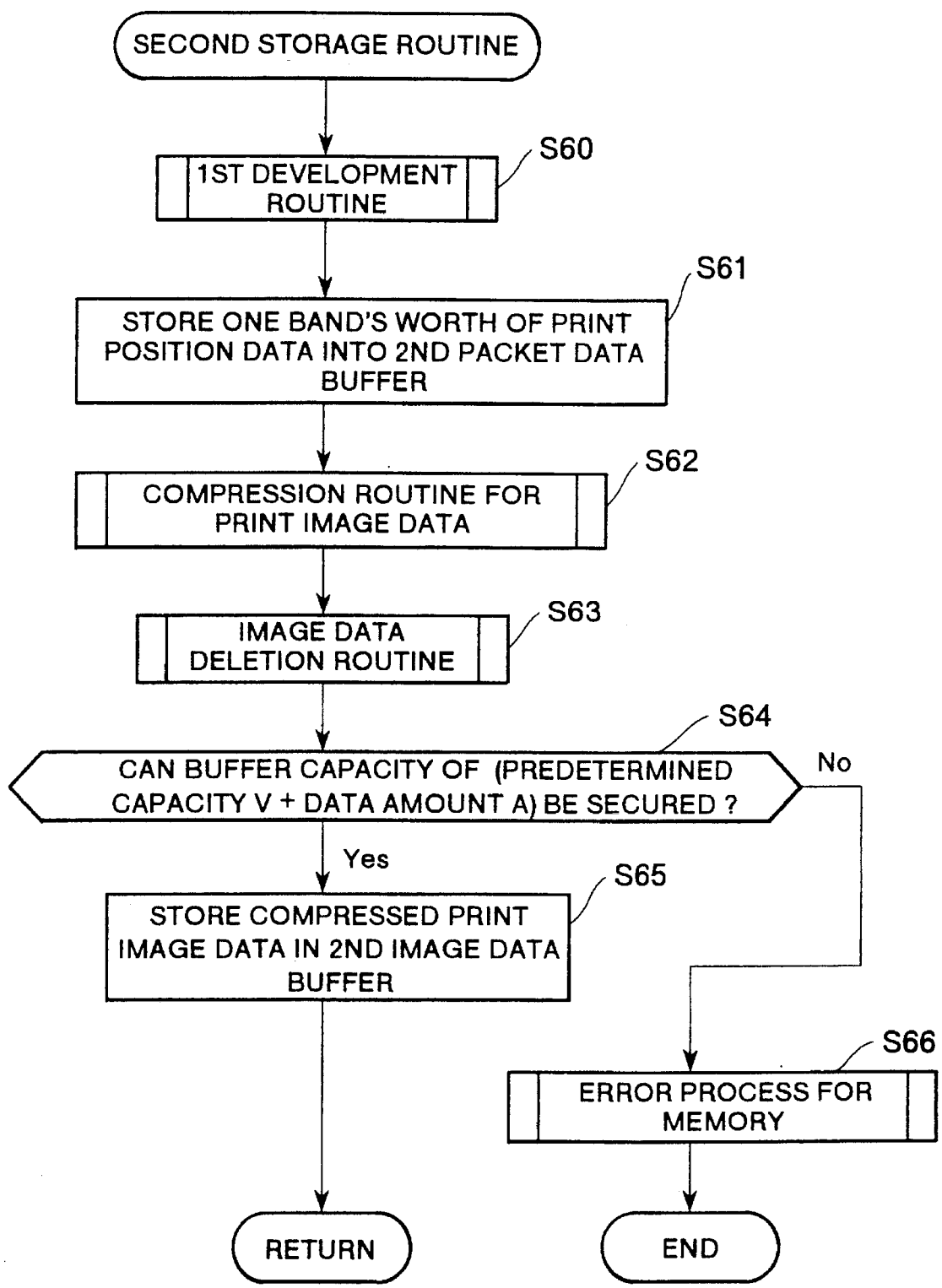
FIG. 10 is a flowchart for illustrating second storage routine.
Figure 11:
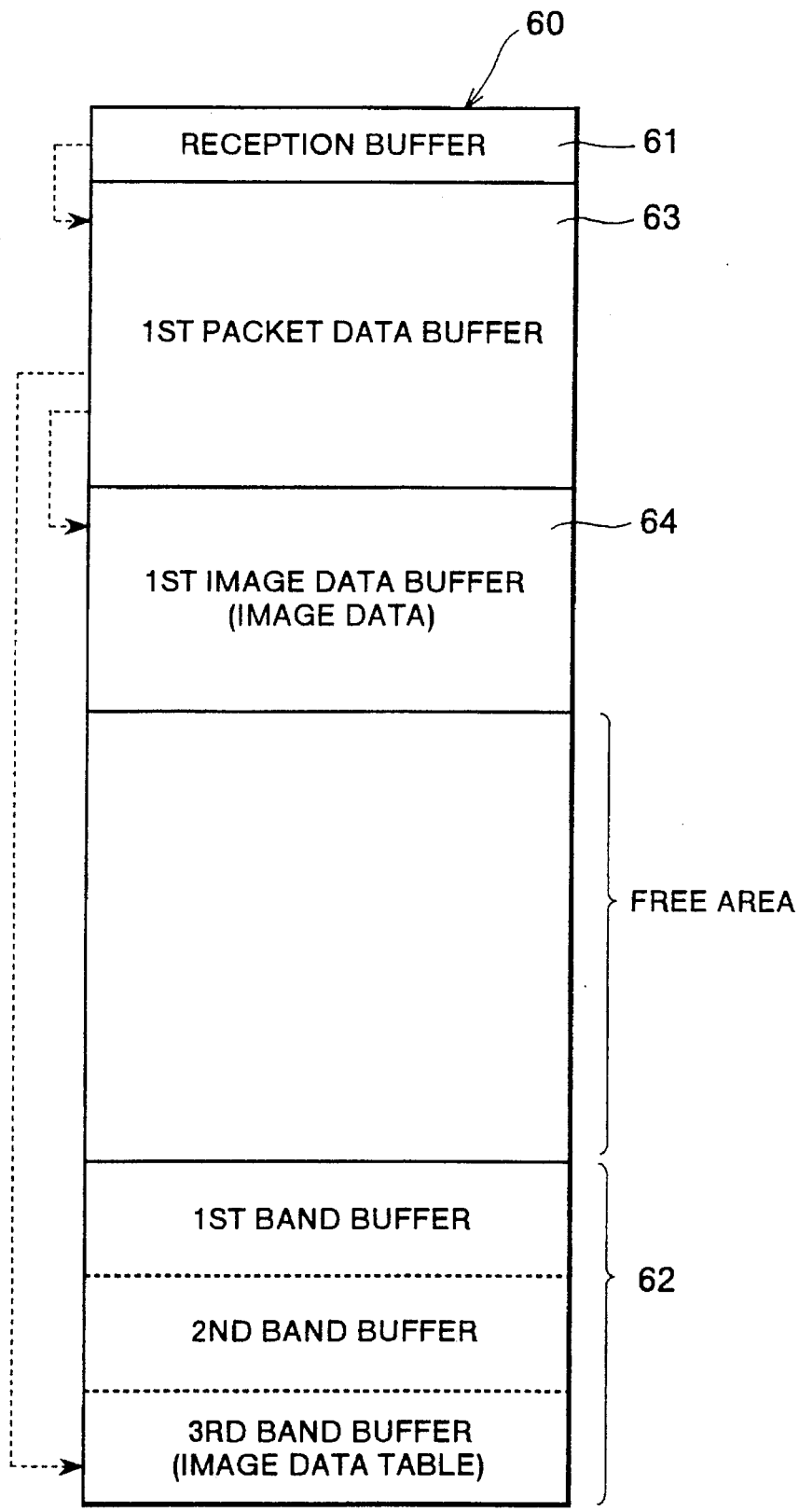
FIG. 11 is an explanatory diagram showing a memory allocation of a RAM in which first packet data buffer and first image data buffer are provided.

The steps S16 and on of the print data development routine are executed as long as, in the same manner as in S13, it is determined in S15 that sufficient buffer capacity can be secured in the second image data buffer 66 to store all the preceding data plus data equal to a single band's capacity B (S15:YES). However, when further buffer capacity can not be secured in the second image data buffer 66 (S15:NO), the second storage routine represented by the flowchart in FIG. 10 is executed (S20).

When this routine is started, the first development routine is executed (S60). Then, one band of packet data, including print position information, that was developed in S60 is stored in the second packet data buffer 65 (S61). The print image data developed in the first band buffer 62a is compressed in the same manner as described previously and the predetermined capacity B of compressed print image data is determined (S62). The image data deletion routine executed again as described above (S63). When the same type of search as performed in S13 indicates that a buffer capacity equal to the addition of one band's worth of the predetermined capacity B can be secured in the second image data buffer 66 (S64:YES), then the print image data compressed in S62 is written into the second image data buffer 66 (S65) and the program returns to the print data development routine shown in FIG. 6. It should be noted than when a buffer capacity equal to the sum of one band's worth of the predetermined capacity B cannot be secured (S64:NO), error processes accompanying generation of a full memory situation are executed (S66) and this routine is terminated.

During the print data development routine, when it is determined that development processes have not been performed on all of the first packet data stored in the first packet data buffer 63 (S21:NO), then S20 and S21 are repeated. However, when development processes have been performed on all of the first packet data (S17:YES, S21:YES), then all of the first packet data of the first packet data buffer is deleted (S18). When development processes have not been completed for all of the present page's worth of print data, that is, when print processes have not been completed (S19:NO), then the program returns to S10, whereupon S10 and on are repeated.

On the other hand, when all of the print data received from the external data transmission device 80 has been developed (S19:YES), then the print image data is outputted to the print mechanism PM and printing processes are performed while the second development routine is performed (S22). Then, the program returns to the main routine.

Figure 15:
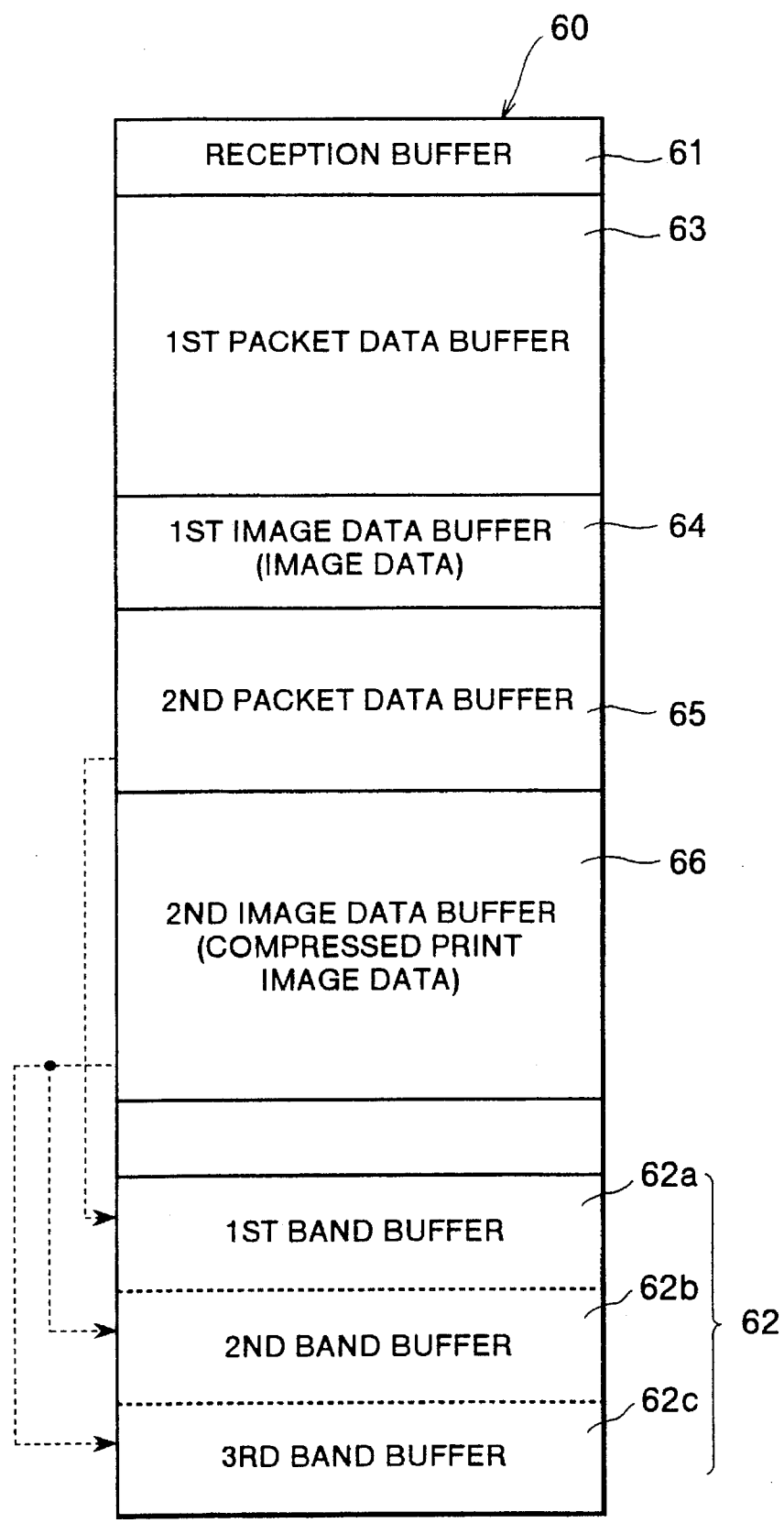
FIG. 15 is an explanatory diagram showing a memory allocation of a RAM when the print image data is developed into the band buffers of the print image buffer.

During the second development routine of S22, as shown in FIG. 15, each band of compressed print image data stored in the second image data buffer 66 is decoded into printable print image data, which is stored in the first band buffer 62a, the second band buffer 62b, and the third band buffer 62c based on the print position information indicated by the second packet data stored in the second packet data buffer 65. Then, the print image data is sequentially outputted to the print mechanism PM starting with the data in the first band buffer 62a. In this way, printing processes are performed while cyclically using the three band buffers. Because the print image data is developed in the band buffers 62a through 62c at timing that is faster than printing processes, print overrun errors will not be generated during printing.

Next, an explanation will be provided for operations of a print development routine than controls print development operations to prevent generation of print overrun errors when a print image buffer 62 having three band buffers 62a through 62c is provided.

The image data received from the reception buffer 61 is stored in the image data buffer 64. The packet information received from the reception buffer 61 is stored in the first packet data buffer 63. The packet information includes code data of characters and symbols and corresponding print position information and also includes print position information for designating printing position of image data.

The printable compressed print image data is stored in the second image data buffer 66. Also, the print position information for the compressed print image data in each band is stored in the second packet data buffer 65. Therefore, the second image data buffer 66 and the second packet data buffer 65 need only have a small capacity. Even when the print image buffer 62 has a small capacity formed from only three band buffers 62a through 62c that are repeatedly used, the compressed print image data can be decoded and developed at a high speed. This results in more efficient use of memory. Additionally, print overrun errors will not be generated during printing operations.

Further, the first and second packet data buffers 63 and 65, the first and second image data buffers 64 and 66 are all provided with a capacity that is variable according to amount of data. Developed image data is deleted from the first image data buffer 64 when expansion of the first image data buffer 64 prevents further expansion of the second image data buffer 66. Therefore, this deletion operation reduces the size of the first image data buffer 64, which generates free area that can be used for expanding the second image data buffer 66 and other buffers. In this way, the memory can be used more efficiently.

The above-described first embodiment can be partially modified. For example, the image data can be stored in a handle format for each band. That is, special regions can be allotted for the image data from each band. Lead pointer addresses that indicate the start of each region can be stored for each band. Regions indicated by respective handles can be managed all at once by a buffer management program. When a handle format is adopted in this way, the buffer management routine can be commanded to delete registration of regions storing developed, and therefore unnecessary image data. The buffer management routine controls the deleted memory regions as additional data memory. Such buffer management routines are well-known in the art.

It has been described that image data that has been developed is deleted from the first image data buffer 64 when the buffer capacity of the second image data buffer 66 can not be expanded. However, when characters are printed on a "reclining" or landscape posture sheet, landscape font data is normally produced in the ROM 52 by rotating, by 90 degrees, the font data stored for printing on normal posture sheets. The font data is then stored in a region termed a font cache. The font data stored in the font cache can be the subject of deletion operations.

In this case, when almost no free area remains, whether or not the generated font is stored in an unprocessed band of the font cache is searched. If the band has been processed, the region is released as free area. The font can again be prepared as needed.

Alternatively, when virtually no free area remains, regions of the first packet data buffer 63 that have been processed can be sequentially released. That is, the print position information for each band of the first packet data buffer 63 is stored in a handle format. It is easy to control the buffer management routine to command, each time a band is processed, release of handle regions that have the print position information on the processed band stored therein.

Further, the second packet data buffer 65 will not increase greater than the data amount of the first packet data buffer 63 because it registers one image data for each band. Accordingly, the second packet data can be prepared by sequentially rewriting portions of bands in the first packet data buffer 63 that have been processed.

Next, a printer according to a second preferred embodiment of the invention will be described. The print data development routine of the second embodiment is the same as that of the first embodiment except for the processing to be described below. According to the second embodiment, the compressed print image data stored in the second image data buffer is subjected to a resolution change to secure a free area to allow another one band's worth of compressed print image data to be stored therein. To this effect, the second embodiment employs a resolution status value Table shown below in which three resolution statuses are provided. Each resolution status indicates a resolution at which print image data is to be developed in the main and auxiliary scanning directions.

TABLE

| Resolution Status | Main Scanning Direction | Auxiliary Scanning Direction |
|---|---|---|
| 0 | 600 dpi | 600 dpi |
| 1 | 600 dpi | 300 dpi |
| 2 | 300 dpi | 300 dpi |

At the start of print data development routine shown in FIG. 6, the resolution status is set to "0". As a result of setting the resolution status to "0", development of the print image data in S42 shown in FIG. 8 is carried out with 600 dpi both in the main and auxiliary scanning directions.

In the second storage routine shown in FIG. 10, when one band's worth of compressed print image data cannot be written into the free area of the second image data buffer 66 (S64:NO), a resolution reduction routine is executed instead of the error process as is done in the first embodiment.

Next, the resolution reduction routine shown in FIG. 16 will be described.

At the start of the resolution reduction routine, first whether or not the resolution status is 2, which is the lowest resolution at which print quality can be guaranteed, is determined in S70. If the resolution status is "0" or "1" (S70:NO), then a band-order value i, which indicates the band in the second image data buffer 66 on which processes are to be performed, is see to 1 (S71) so that the following processes are performed on data stored in the first band of the second image data buffer 66. Next, the compressed print image data of the i-th band (which is now the 1st band, i.e., i=1) in the second image data buffer 66 is decoded based on the corresponding second packet data in the second packet data buffer 65 to provide print image data (S72).

If the resolution of the print image data is the predetermined resolution, that is, 600 dpi in both the main and auxiliary scanning directions, then the resolution status is changed to "1" and resolution of the print image data is reduced to 300 dpi in the auxiliary scanning direction while remaining 600 dpi resolution in the main scanning direction. This can be achieved by deleting every other raster line of the print image data. If the resolution has already been reduced to a resolution status of "1", then the resolution status is changed to "2" and resolution of the 600-by-300-dpi print image data is further reduced to 300 in both the main and auxiliary scanning directions by deleting every other dot in the main scanning direction (S73).

Next, in S74, the second packet data written in the second packet data buffer 65 in S61 is changed, and the print image data with the reduced resolution is compressed using the same processes as in S62. The compressed print image data is again written in the second image data buffer 66 using the same processes as in S65. Next, the value of the band order 1 is incremented by one to indicate the next band in series (S75). In S76, whether or not resolution reduction processes have been performed on data in all bands of the second image data buffer 66 is determined. If not, S72 to S76 are repeated until all data has been processed. All the compressed high-resolution print image data in the second image data buffer 66 that has not yet been subjected to resolution reduction processes is rewritten to compressed image data with resolution reduced to one half. Therefore, about half of the capacity of the second image data buffer 66 is secured as free area.

While in this condition (S76:YES), the first development processes of S30 are performed on the first packet data in the i-th band of the first packet data buffer 63 to develop print image data with a predetermined resolution of 600 dpi in both the main and auxiliary scanning directions (S77). Then, in S78, when 600-by-600 dpi print image data is reduced to a resolution status of "1", the print image data is converted to print image data with a resolution of 600 by 300 dpi and compressed in the same manner as in S73. On the other hand, when 600-by-600 dpi print image data is reduced to a resolution status of "2," the print image data is converted to print image data with a resolution of 300 by 300 dpi and compressed.

The image data is deleted in the same manner as in S63 and the first packet data is deleted from the i-th band (S79) so that the free area generated in the first packet data buffer 63 and in the first image data buffer 64 can be used as the free area for the second image data buffer 66. Next, it is determined whether or not the second image data buffer 66 has a memory space allowing to store another one band's worth of the compressed print image data having a predetermined data amount C. The predetermined capacity C changes depending on the resolution status. For example, the predetermined data amount C is equal to about one half the available capacity B when the resolution is reduced to a status of "1", and equal to about one fourth the available capacity B when the resolution is reduced to a status of "2." Assuming the predetermined capacity S is 160 kilobytes as described above, the data amount C will be about 80 kilobytes at resolution status of "i" and 40 kilobytes at resolution status of "2".

If the memory space can not be secured (S80:NO), the program returns to S70, where the resolution status is checked. When the resolution is already at status "2" (S70:YES), then full memory error processes are performed (S82) and this routine is terminated. When the resolution is at status "0" or "1" (S70:NO), then the program proceeds to S71 in order to reduce the resolution to status of "2". When the memory space can be secured in the second image data buffer 66 (S80:YES), compressed image data at the reduced resolution is stored in the second image data buffer 66 (S74) and the program proceeds to S21 of the printer development routine shown in FIG. 6.

Referring to The flowchart of FIG. 6, when development processes have not been performed on all of the first packet data stored in the first packet data buffer 63 (S21:NO), then S20 and S21 are repeated. It should be noted that since the resolution status has been changed to "1" or "2", all subsequent processes are performed at the reduced resolution. However, when development processes have been performed on all the first packet data (S17:YES or S21:YES), then all the first packet data is deleted from the first packet data buffer (S18). When development processes have not been performed on an entire page of print data, that is, when print processes have not been completed (S15:NO), then the program returns to S10, whereupon S10 and on are executed. At this time, the second packet data is treated as the first packet data and the data processing will then be performed with respect to this packet data. The resolution status will not be cleared until processes are completed for the page and a positive determination is made in S19.

Figure 16:
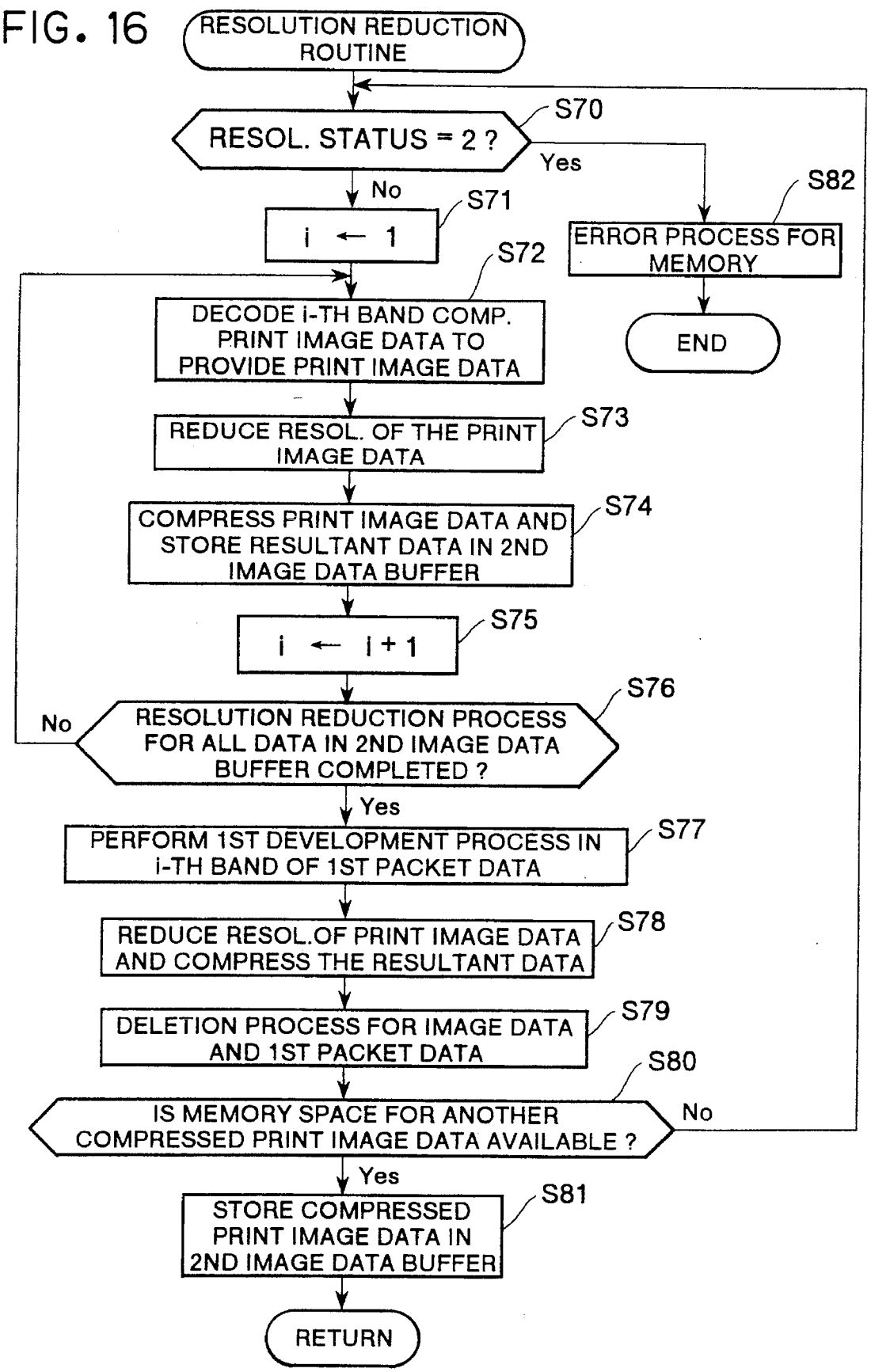
FIG. 16 is a flowchart for illustrating resolution reduction routine employed in a second embodiment of the present invention.

On the other hand, when all the print data received from the external device has been developed (S19:YES), then a possibility exists that data with a different resolution may get mixed with the second packet data because, for example, the resolution is reset to 600 by 600 dpi after the processes shown in FIG. 16 are completed. For this reason, notwithstanding the fact that all the print data has been developed, the processes from S10 on are repeated, so that the data stored in the second image data buffer 66 is all rendered to the same resolution statuses. Next, while second development processes are being performed, print image data is outputted to the print mechanism PM, where print processes are performed (S22). Then, this routine is terminated and the program returns to the main routine.

When the second development routine is performed after execution of the resolution reduction processes in S66, then compressed print image data in each band is decoded into print image data with a reduced resolution. The developed print image data is then converted back into print image data with the predetermined resolution and developed in the print image buffer 62. Data is converted from a reduced resolution to the predetermined resolution by, when data is at a reduced resolution of 600 by 300 dpi, or status "1", repeating each line of data twice, thereby producing two lines of data from one and resulting in print image data converted to the predetermined resolution of 600 by 600 dpi, or to status "0".

When the subject data has a reduced resolution of 300 by 300 dpi, or status "2", each line of data is first repeated twice, as described above, and then also each dot of data is repeated twice to produce two dots from each dot of data. This results in print image data converted to the predetermined resolution of 600 by 600 dpi, or to status "0".

According to the second embodiment, when insufficient capacity remains in the second image data buffer 66 to store one page's worth of compressed print image data, the resolution of the already stored compressed print image data is automatically reduced, thereby generating free area in the second image data buffer 66. Because ibis free area can be utilized, insufficient memory capacity rarely becomes a problem even when only a small capacity is available.

The second embodiment can be partially modified. For example, while in the above-described second embodiment the print image data is subjected to resolution restoration to the original predetermined resolution of 600 by 600 dpi before storing the decoded print image data in the print image buffer 62, the print image data with the reduced resolution can be stored in the print image buffer 62 and converted to print image data with the original predetermined resolution when outputted to the recording sheet P. In this case, the capacity of a predetermined band buffer 62 can be reduced and the capacity of the second image data buffer 66 increased.

Also, the print image data can be outputted directly from the second image data buffer 66 to the print mechanism PM, thereby removing the need to provide a hand buffer 62.

Although whether or not sufficient free area exists in the second image data buffer 66 to store one band's worth of compressed print image data is determined in S13, S15, S64, and S80, these determinations can be made regarding the storage of two or more band's worth of print image data.

When it is determined that compressed print image data with a predetermined resolution cannot be stored in free area of a image data buffer, then compressed print image data of a reduced resolution is stored in the free area of the image data buffer. Therefore, one page's worth of print data can be stored in the print data buffer even when the print data buffer is provided a small capacity, that is unable to contain one page's worth of compressed print image data. The compressed data can be quickly decoded and developed into print image data with a format usable by the printer. Compared to when packet data is individually processed, fewer processes are required during printing so that print overrun errors can be prevented.

The first and second packet data buffers and the first and second image data buffers are each provided with capacity that expands and contracts according to data amount. Therefore, the free area available in the first image data buffer, for example, can be used as a free area for the second image data buffer. By doing so, memory can be used more efficiently.

Whether or not one band's worth of compressed print image data can be stored in the free area of the second image data buffer is determined. Therefore, printing can be continued at a predetermined high resolution until the free area of the image data buffer is reduced to one band's worth or less. Also, when the compressed print image data cannot be stored in free area of the second image data buffer, the resolution of the compressed print image data stored in the band of the image data buffer is reduced. Therefore, the free area of the second image data buffer increases, so that printing can be performed by reducing resolution only once.

Further, the resolution in the auxiliary scanning direction is reduced by one half. Therefore, print image data with a reduced image can be prepared from the print image data at a predetermined higher resolution by merely deleting data in single line intervals.

Figure 17:
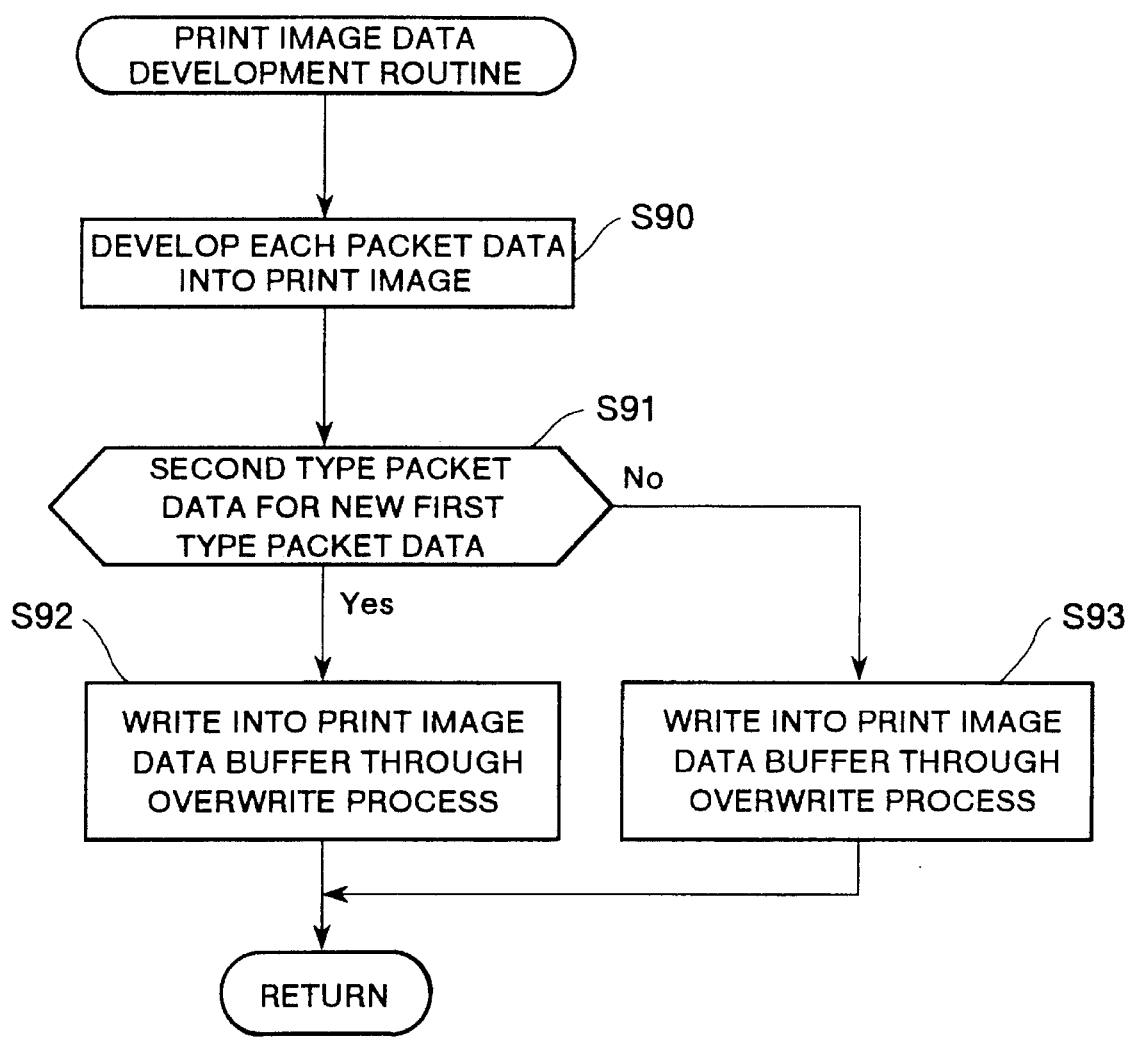
FIG. 17 is a flowchart for illustrating print image data development routine employed in a third embodiment of the present invention.

Next, a printer according to a third preferred embodiment of the present invention will be described. The printer of the third embodiment is the same as that of the first embodiment, but further includes, in S42, processes of a print image data development routine represented by the flowchart in FIG. 17.

When one page's worth of print data has not been completely developed, that is, when print processes have not been completed (S19:NO), then that means that one page's worth of first packet data from received print data has not been completely developed. The first packet data that does not amount to one page's worth has been developed into print image data in S30 or S60, prepared into second packet data in S31 or S61, and compressed into print image data in S33 or S62 at the point in time when free area is determined in S11 to be less than one half the originally available amount, that is, when the capacity of the first packet data buffer 63 or the image data buffer 64 reaches a predetermined capacity. Accordingly, the program returns to S10, whereupon the S10 and on are repeated.

While these processes are being repeated, first packet data is prepared in S10 for the remainder of the one page's worth of print data and then stored in the second packet data buffer 65 after the second packet data. The second packet data and the following first packet data are treated as a new group of first packet data.

In S42, processes of the print image data development routine of FIG. 18 are performed on this new first packet data. At the start of the print image data development routine, each packet data is developed into print image data in order (S80). Whether or not the first packet data retrieved in S40 is data edited into first packet data after setting second packet data is determined in S81. If so, the print image data developed in S80 is developed by overwrite processes in the first band buffer 62a of the print image buffer (S83). That is, one band's worth of the new first packet data has been converted once to second packet data. Additionally, the one band's worth of new first packet data is processed before the subsequent first packet data. Therefore, the content of the first band buffer 62a can be deleted. Accordingly, simple overwrite processes that simply write can be used. When S81 results in a negative judgement, print image data and print image data previously developed in the first band buffer 62a are OR-written, and the result again stored in the first band buffer 62a (S83). Then the program returns to S43.

The third embodiment can be modified. For example, because the second packet data buffer 65 registers a single group of image data in each band, it will not increase to larger than the data amount of the first packet data buffer 63. Accordingly, it is possible to prepare the second packet data by rewriting the order of bands in the first packet data buffer 63 that have been processed.

A printer according to the third embodiment performs printing after one pace's worth of first packet data is developed into print image data. Therefore, print overrun errors will not be generated. Also, when the capacity of the first packet data buffer reaches or exceeds a predetermined capacity while one page's worth of first packet data is being prepared, the first packet data that has been prepared as of that time is developed into print image data and prepared into second packet data. Afterward, the remaining first packet data is prepared. Therefore, data processes can be performed on one page's worth of data even when the first packet data buffer has only a small capacity.

When new first packet data is developed into print image data, second packet data of the edited first and second packet data is developed into print image data using overwrite processes. Therefore, processes can be performed faster than if OR-writing were used.

A printer according to the third embodiment develops one page's worth of first packet data into print image data, compresses the print image data, and stores the compressed print image data in an image data buffer. Afterward, printing processes are performed. Because the compressed print image data can be decoded into print image data faster than printing processes can be performed, print overrun errors will not be generated. Also, print image data, which normally requires a large memory capacity for storage, can be stored in a small-capacity image data buffer.

Also, when the capacity of either the first packet data buffer or the image buffer reaches or exceeds a predetermined capacity while one page's worth of first packet data is being prepared, the first packet data that has been prepared as of that time is developed into print image data and prepared into second packet data. Afterward, the remaining first packet data is prepared. Therefore, data processes can be performed on one page's worth of data even when the first packet data buffer has only a small capacity.

Also, second packet data can be developed into print image data at a high speed.

Further, the reception buffer for storing image data, which requires a large memory capacity, and also the first and second packet data buffers, the image data buffer, and the image data buffer are all constructed so that its capacity is expandable according amount of data in a memory means. Therefore, the area in each buffer can be reduced or expanded, thereby increasing efficiency of memory usage.

While the invention has been described in detail with reference to specific embodiments thereof, it would be apparent to those skilled in the art that various changes and modifications may be made therein without departing from the spirit of the invention, the scope of which is defined by the attached claims. For example, the print image buffer 62 could be provided with four or more band buffers.

What is claimed is:

1. A printer comprising:

a reception buffer storing print data received from an external device;

first packet data storing means for receiving the print data from said reception buffer and storing first type packet data including code data indicative of a character or a symbol and print position information indicative of a print position of the character or the symbol identified by the code data, the first type packet data being prepared on a band basis wherein the band is defined by a predetermined range of data amount;

developing means for sequentially developing the first type packet data into print image data in a printable format;

compression means for compressing according to a predetermined compression format, the print image data developed by said developing means to provide compressed print image data;

compressed print image data storing means having a storage capacity for storing the compressed print image data on the band basis;

judgement means for judging whether or not one band's worth of the compressed print image data can be stored in said compressed print image data storing means;

storage capacity securing means for increasing the storage capacity of said compressed print image data storing means when said judgement means judges that the one band's worth of compressed print image data cannot be snored in said compressed print image data storing means;

decoding means for decoding the compressed print image data stored in said compressed print image data storing means into the print image data; and printing means for printing, on a print medium, the print image data provided by said decoding means while feeding the print medium in an auxiliary scanning direction.

2. A printer as claimed in claim 1, further comprising second packet data storing means for storing second type packet data including print position information indicative of print position of the compressed print image data stored in said compressed print image data storing means, and wherein said decoding means decodes the compressed print image data into the print image data in accordance with the second type packet data.

3. A printer as claimed in claim 2, further comprising image data storing means for storing image data, the image data being further included in the first type packet data together with print position information indicative of a print position of the image information.

4. A printer as claimed in claim 2, wherein each of said image data storing means and said compressed print image data storing means has a variable storage capacity, and wherein said storage capacity securing means secures the storage capacity of said compressed print image data storing means enough for storing one band's worth of compressed print image data by erasing of the image data that has been developed into the print image data by said developing means.

5. A printer as claimed in claim 2, wherein said storage capacity securing means secures the storage capacity of said compressed print image data storing means by reducing an amount of data of the one band's worth of compressed print image data to be stored therein.

6. A printer as claimed in claim 5, wherein said developing means develops the first type packet data into the print image data of a predetermined resolution, and wherein said storage capacity securing means secures the storage capacity of said compressed print image data storing means by developing the first type packet data into the print image data of a resolution lower than the predetermined resolution.

7. A printer as claimed in claim 2, wherein said storage capacity securing means secures the storage capacity of said compressed print image data storing means enough for storing one band's worth of compressed print image data by reducing an amount of data having been stored in said compressed print image data storing means.

8. A printer as claimed in claim 7, wherein said developing means develops the first type packet data into the print image data of a predetermined resolution, and wherein said storage capacity securing means secures the storage capacity of said compressed print image data storing means by reducing the predetermined resolution of the compressed print image data having been stored in said compressed print image data storing means to a lower value.

9. A printer as claimed in claim 8, wherein the reduction of the resolution is performed with respect to the auxiliary scanning direction of the print image data.

10. A printer comprising:

a reception buffer storing print data received from an external device, the print data including character/symbol data and image date, the character/symbol data having code data indicative of a character or a symbol and print position information indicative of a print position of the character or the symbol identified by the code data, the image data having image information and print position information indicative of a print position of the image information;

first image data storing means for storing image information received from said reception buffer;

first packet data storing means for storing first type packet data that includes the code data and the print position information of the character/symbol data and print position information of the image data;

second image data storing means for storing compressed printable data, the compressed printable data being produced on a band basis from the image information stored in said first image data storing means and the first type packet data stored in said first packet data storing means;

second packet data buffer means for storing second type packet data including print position information indicative of print position of the compressed printable data stored in said second image data buffer means;

print data storing means for storing printable data decoded from the compressed printable data; and print means for printing on a print medium, the printable data received from said print data buffer means.

11. A printer as claimed in claim 10, further comprising:

developing means for developing, into the printable data, code data stored in said first packet data storing means and the image information stored in said first image data storing means into the printable data on a band basis; and compression means for compressing, according to a predetermined compression formula, the printable data developed by said developing means and for supplying compressed printable data to said second image data storing means.

12. A printer as claimed in claim 11, wherein said first packet data storing means said second packet data storing means, said first image data storing means, and said second image data storing means are each provided with storage capacities that are variable in accordance with an amount of data to be stored therein and the printer further comprising image data deletion means for deleting, from said first image data storing means image information whose development has been completed by said first developing means.

13. A printer as claimed in claim 12, wherein a tonal storage capacity of said first packet data storing means, said second packet data storing means, said first image data storing means, and said second image data storing means is constant.

14. A printer as claimed in claim 13, wherein said first packet data storing means has a data storage area, and at least a part of the data stored area is awarded to said second packet data storing means when development and compression processes for data in the part of the data storage area has been completed.

15. A printer as claimed in claim 11, further comprising decoding means for decoding, into the printable data, the compressed printable data stored in said second image data storing means and for sequentially developing the printable data in said print data storing means on a band basis based on the second packet data received from said second packet data storing means.

16. A printer as claimed in claim 15, wherein said print image storing means temporarily stores the printable data when developed by said first developing means.

17. A printer comprising:

a reception buffer snoring print data received from an external device, the print data including character/symbol data and image data, the character/symbol data having code data indicative of a character or a symbol and print position information indicative of a print position of the character or the symbol identified by the code data, the image data having image information and print position information indicative of a print position of the image information;

first packet data buffer storing a first type packet data that includes the code data and the print position information of the character/symbol data;

image data buffer storing compressed printable data on a band basis, the compressed printable data being providing by firstly developing the code data stored in said first packet data buffer into printable data and then compressing the printable data into the compressed printable data;

second packet data buffer storing a second type packet data that includes print position information indicative of a print position of the printable data that is compressed and stored in said image data buffer; and print means for printing, on a print medium, the printable data upon decoding the compressed printable data.

18. A printer as claimed in claim 17, wherein said first packet data buffer has a data storage area, and at least a part of the data storage area is awarded to said second packet data buffer when development and compression processes for data in the part of the data storage area has been completed.

19. A printer comprising:

a reception buffer for storing print data received from an external device;

a packet data buffer for storing, for each band, packet data including data on characters and symbols received from said reception buffer and including print position on the characters and symbols;

developing means for sequentially developing, in a predetermined resolution, print image data of code data of each character and symbol in bands of said packet data buffer;

compression means for compressing, in a predetermined compression format, print image data developed by said first developing means;

image data buffer for storing, for each band, compressed print image data;

judging means for judging whether or not the compressed print image data can be stored in an empty area of said image data buffer;

resolution reduction means for reducing resolution at which print image data is developed by said developing means when said judging means judges that storage is impossible;

decoding means for decoding compressed print image data snored in said image data buffer into printable print image data; and printing means for printing, on a print medium, the printable print image data from said decoding means while feeding the print medium in an auxiliary scanning direction.

20. A printer as claimed in claim 19, wherein said packet data buffer and said image data buffer have a capacity variable according to data amount.

21. A printer as claimed in claim 19, wherein when said judging means judges that storage is impossible, said resolution reduction means reduces resolution of compressed print image data stored in bands of said image data buffer and performs, at the reduced resolution, development by said developing means of print image data in the bands.

22. A printer as claimed in claim 19, wherein said resolution reduction means reduces the resolution in an auxiliary scanning direction.

23. A printer for receiving print data from an external device and printing the print data, printer comprising:

first packet data preparing means for preparing first type packet data, including data and print position information on characters and symbols, and sequentially storing the first type packet data in bands of a first packet data buffer until one page's worth of data has been stored, the first packet data buffer having a storage capacity;

first developing means for developing each band of the first type packet data and snoring the first type packet data in an image data buffer;

second packet data preparing means for preparing second type packet data relating to each band of print image data and storing the second type packet data in a second packet data buffer;

packet data editing means for, when the storage capacity of the first packet data buffer reaches or exceeds a predetermined capacity while said first packet data preparation means prepares one page's worth of first type packet data, performing development of completely prepared first type packet data into print image data by said first development control means, preparation of second type packet data by said second packet data preparing means, and preparation of a remainder of one page's worth of first type packet data and then deleting the second type packet data and the first type packet data into new first type packet data; and overwrite process means for, when the new first type packet data is developed into print image data by said first development means, performing overwriting processes on development of second type packet data to print image data in the first type packet data and the second type packet data edited by said packet data editing means.

24. A printer for receiving print data, including image data, from an external device and printing the print data, printer comprising:

an image data buffer for storing image data;

first packet data preparing means for preparing first type packet data, including data and print position information on characters and symbols and print position information indicating printing position of the image data, and for sequentially storing the first type packet data in bands of a first packet data buffer until one page's worth of data has been stored;

first developing means for developing each band of the first type packet data and storing the first type packet data in an image data buffer;

compression means for compressing the print image data and storing resultant compressed data in each band of an image data buffer;

second packet data preparing means for preparing second type packet data relating to each band of compressed print image data and storing the second type packet data in a second packet data buffer;

second developing means for developing the compressed print image data into printable print image data based on the second type packet data;

packet data editing means for, when capacity of the first packet data buffer or the image buffer reaches or exceeds a predetermined capacity while said first packet data preparation means prepares one page's worth of first type packet data, performing development of completely prepared first type packet data into print image data by said first developing means, compression by said compression means, preparation of second type packet data by said second packet data preparing means, and preparation of a remainder of one page's worth of first type packet data and then editing the second type packet data and the first type packet data into new first type packet data; and overwrite process means for, when the new first type packet data is developed into print image data by said first development means, performing overwriting processes on development of second type packet data to print image data in the first type packet data and the second type packet data edited by said packet data editing means.

25. A printer as claimed in claim 24, wherein the first packet data buffer, second packet data buffer, and the image data buffer all have storage capacity that is variable according to data amount.

26. A method of developing print data into printable data comprising the steps of:

receiving, in a reception buffer, print data that includes image data transmitted from an external device;

developing the print data into print image data;

a first step for storing image data in an image data buffer and for storing, in a first packet data buffer, packet data that includes code data and print position information of characters and symbols, and print position information for designating print position of image data;

a second step for receiving data from the image data buffer and from the first packet data buffer, for developing data from each band into print image data, for compressing the data into compressed image data, for storing compressed data in the image data buffer, and for storing, in a second packet data buffer, packet data that includes print position information designating print position of compressed image data for each band stored in the image data buffer; and a third step for decoding, into print image data in a printable format, the compressed print image data stored in the image data buffer and for serially developing, based on the packet data received from the second packet data buffer, the print image data in each band of the second packet data buffer.

* * * * *